PROTECTION SYSTEM

Filed July 28, 1966

INVENTOR.
PAUL MADDISON HAWKINS
BY
Ward, Haselton, McElhannon, Orme, Brooks & Fitzpatrick
ATTORNEYS May 13, 1969 P. M. HAWKINS 3,444,546

PROTECTION SYSTEM

Filed July 28, 1966 Sheet 2 of 11

INVENTOR.
PAUL MADDISON HAWKINS

BY

Ward, Haselton, McElhannon, Orme, Brooks & Fitzpatrick
ATTORNEYS

INVENTOR.
PAUL MADDISON HAWKINS
BY
Ward, Haselton, McElhannon, Orme, Brooks & Fitzpatrick
ATTORNEYS INVENTOR.
PAUL MADDISON HAWKINS
BY
Ward, Haselton, McElhannon, Orme, Brooks & Fitzpatrick
ATTORNEYS INVENTOR
PAUL MADDISON HAWKINS
BY
Ward, Haselton, McElhannon, Orme, Brooks & Fitzpatrick
ATTORNEYS INVENTOR.
PAUL MADDISON HAWKINS
BY
Ward, Haselton, McElhannon, Orme, Brooks & Fitzpatrick
ATTORNEYS INVENTOR.
PAUL MADDISON HAWKINS
BY
Ward, Haselton, McElhannon, Orme, Brooks & Fitzpatrick
ATTORNEYS

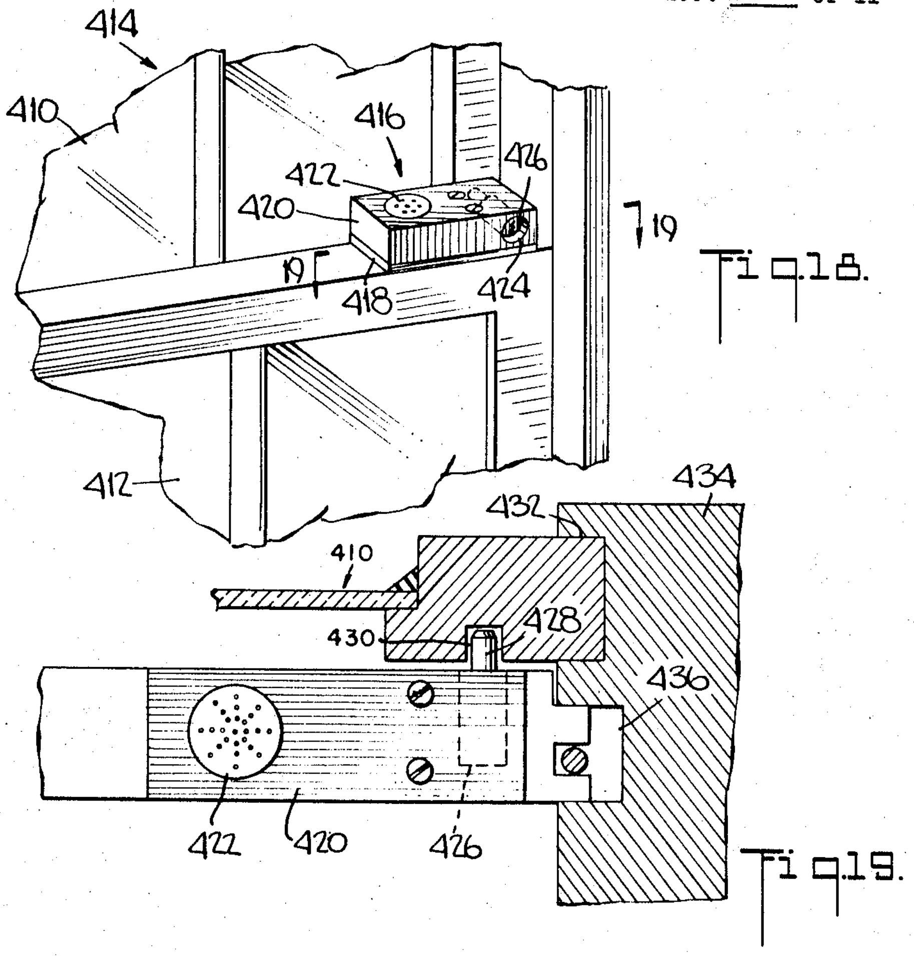
FIG. 18, FIG. 19
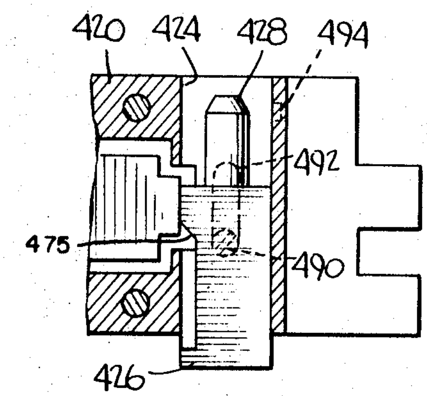
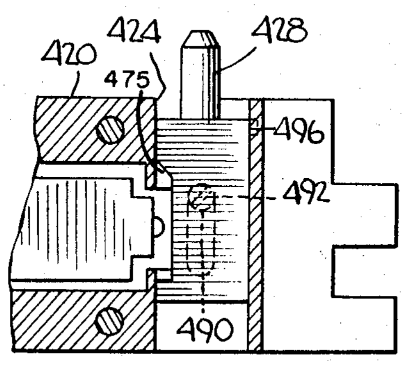
FIG. 24.
FIG. 23.
INVENTOR.
PAUL MADDISON HAWKINS
BY
Ward, Haselton, McElhannon, Orme, Brooks & Fitzpatrick
ATTORNEYS INVENTOR
PAUL MADDISON HAWKINS
BY
Ward, Haselton, McElhannon, Orme, Brooks & Fitzpatrick
ATTORNEYS INVENTOR.
PAUL MADDISON HAWKINS
BY
Ward, Haselton, McElhannon, Orme, Brooks & Fitzpatrick
ATTORNEYS

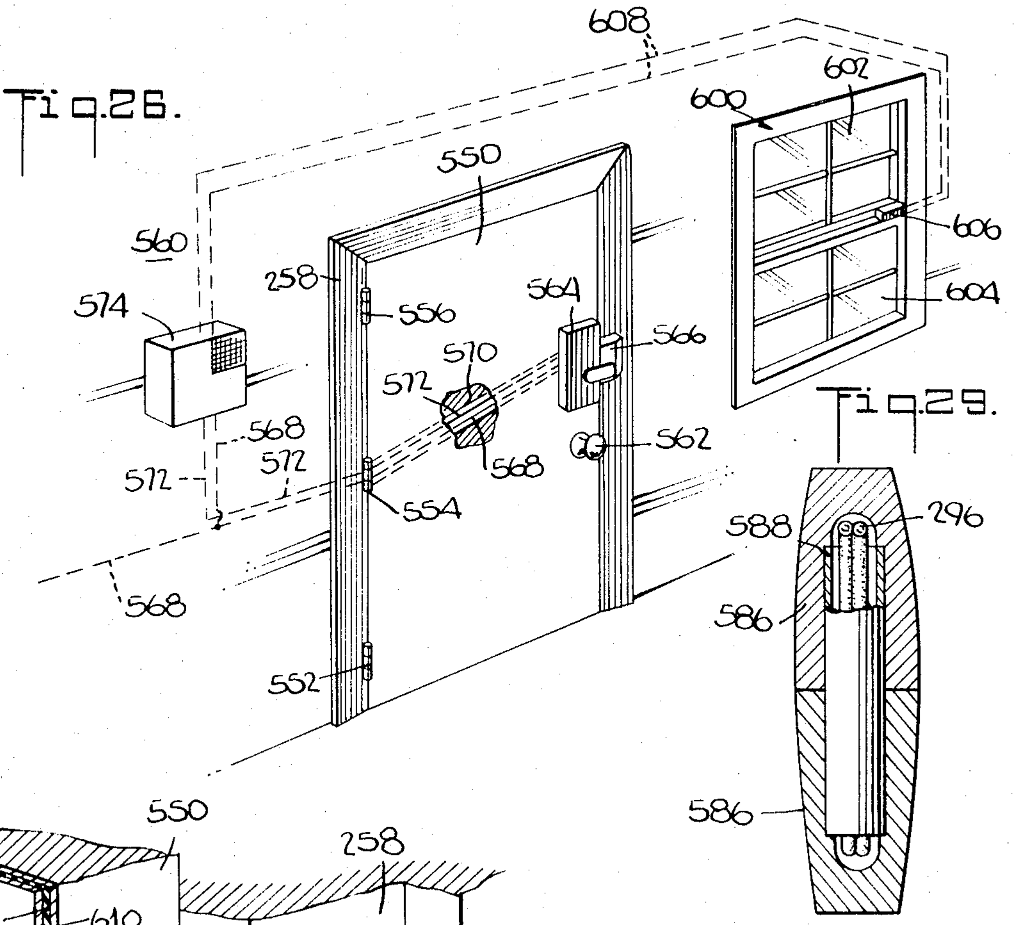
FIG. 26, FIG. 29
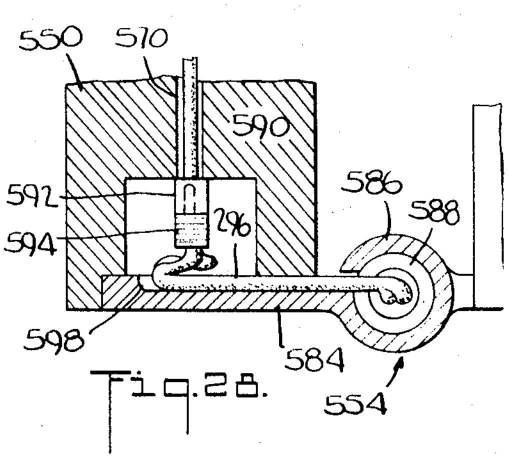
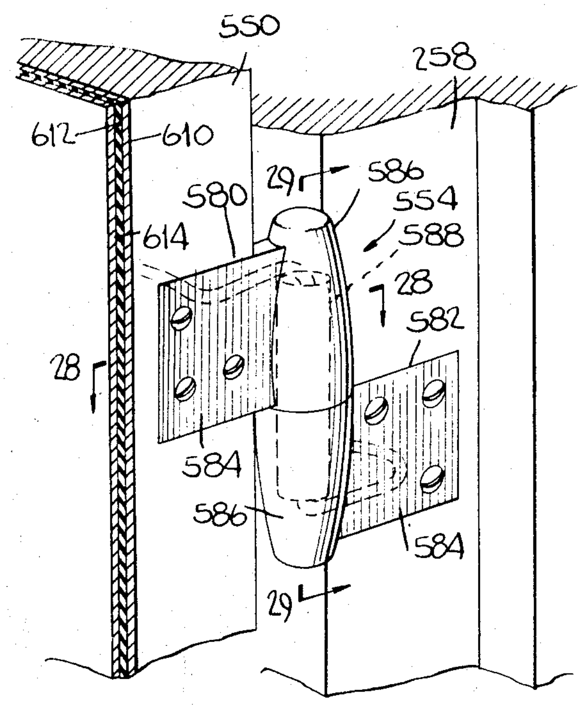
FIG. 27.
INVENTOR.
PAUL MADDISON HAWKINS
Ward, Haselton, McElhannon, Orme, Brooks & Fitzpatrick
ATTORNEYS 3,444,546
Patented May 13, 1969

3,444,546

PROTECTION SYSTEM

Paul Maddison Hawkins, Jericho, N.Y., assignor to General Alarm Corporation, New York, N.Y., a corporation of Delaware Filed July 28, 1966, Ser. No. 568,546
Int. Cl. G08b *21/00*
U.S. Cl. 340—274 31 Claims

ABSTRACT OF THE DISCLOSURE

Security alarm systems incorporating bolt and chain locks arranged to respond to unauthorized manipulation or forcing to sound an electrically powered alarm.

This invention relates to security systems and more particularly it concerns novel alarm-lock arrangements for use in conjunction with various closures such as doors and windows.

Past alarm-lock systems were often limited in that they required elaborate and expensive equipment and were complicated to operate. Further, it was difficult to integrate such systems into houses or other structures which had already been built.

The present invention provides a simple and very compact alarm system which may be completely self contained and which can readily be attached to doors and the like of existing houses and other structures to be protected.

According to one aspect of the present invention there is provided an alarm-lock system comprising an electronic oscillator circuit which, when energized, drives a loudspeaker to produce acoustical alarm signals. There is also provided an electrical power supply circuit which includes a first switching means for connecting a voltage source to the oscillator circuit. This first switching means is of the latching type, that is, it remains closed once set so that the alarm circuit remains in operation. In addition there are provided condition responsive switching means which serve to activate and close the first switching means. The condition responsive switching means include a normally open switch arranged to close when an opening force of a certain magnitude is applied to the door or closure. A still further normally closed switch is connected in series with the first switch means and serves to turn off the alarm circuit under certain conditions.

In another aspect, the present invention makes use of a special key operated switching arrangement which serves to actuate the alarm in response to unauthorized attempts to retract a locking bolt. This serves to protect against lock picking. At the same time, it permits certain keys to open the lock but not without actuating the alarm. The significance of this is that custodians and other service personnel may be given keys which will permit them to enter a protected premises under certain emergency conditions. Such entry, although easily made, will set off the alarm and will immediately attract other persons both to aid in the emergency and to check on the person making the entry.

According to this last described aspect, there are provided in one embodiment two separate lock cylinders arranged in tandem so as to be engaged simultaneously by a special elongated key. Only the cylinder toward the outside of the protected premises controls the protraction and retraction of the locking bolt. Both cylinders however control the opening and closing of separate cylinder switches and the two cylinder switches are arranged such that their contacts are connected in series. These cylinder switches are arranged such that the one associated with the bolt control cylinder is closed when the bolt is protracted or in locking condition, and the other switch is open. When a special elongated key is used from outside to unlock the premises, it turns both cylinders, so that although the first switch is closed, the second switch is opened and no alarm sound is produced. On the other hand, when a conventional length key is used only the first cylinder is turned, and although the bolt is retracted by it, nevertheless, the first switch is closed and the alarm is actuated.

In a second embodiment a single lock cylinder is arranged in conjunction with a single switch for the same purpose.

The present invention further makes use of a special switching arrangement by which only an elongated key will serve to turn off the alarm, once it has been set off.

According to a further aspect of the present invention, there is provided a special strap or chain lock arrangement which serves to initiate alarm operation when subjected to excessive tension as may be produced by tampering or forcing. This special chain lock arrangement includes a special engaging feature which permits simple yet positive engagement and disengagement by merely operating a thumb latch element.

The present invention permits for the convenient incorporation of remote alarm actuating means and for the economical and effective centralization of alarm arrangements located at several displaced closures. Moreover, there is provided according to the present invention, novel lock-alarm means which is compact yet versatile enough for use on windows and other closures. In this connection there are provided special hinge means for bringing electrical power into a closure mounted alarm lock. This special hinge means includes a tubular hinge pin through which electrical cables from intra wall and intra closure passages extend.

A particularly advantageous feature of the present invention is the provision of a lock-alarm system which is capable of providing pre-entry protection. That is, the system of the present invention provides for the actuation of an alarm whenever the locking mechanism is tampered with in any illegitimate manner and before any damage has been done to the locking mechanism itself. Thus at the time the alarm is sounded, the locking mechanism remains effective to protect the closure.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 18 is a fragmentary perspective view illustrating the application of one form of the present invention to a window type closure;

FIG. 19 is a fragmentary section view taken along lines 19—19 of FIG. 18;

FIGS. 23 and 24 are fragmentary plan views illustrating certain lock and switch inter-relationships obtained in the unit of FIG. 20;

FIG. 26 is a perspective view illustrating the application of a system according to the present invention to an appartment type enclosure;

FIG. 27 is a perspective view illustrating a door hinge arrangement utilized in the system of FIG. 26;

FIG. 28 is a section view taken along line 28—28 of FIG. 27; and

FIG. 29 is a section view taken along lines 29—29 of FIG. 27.

Figure 1:
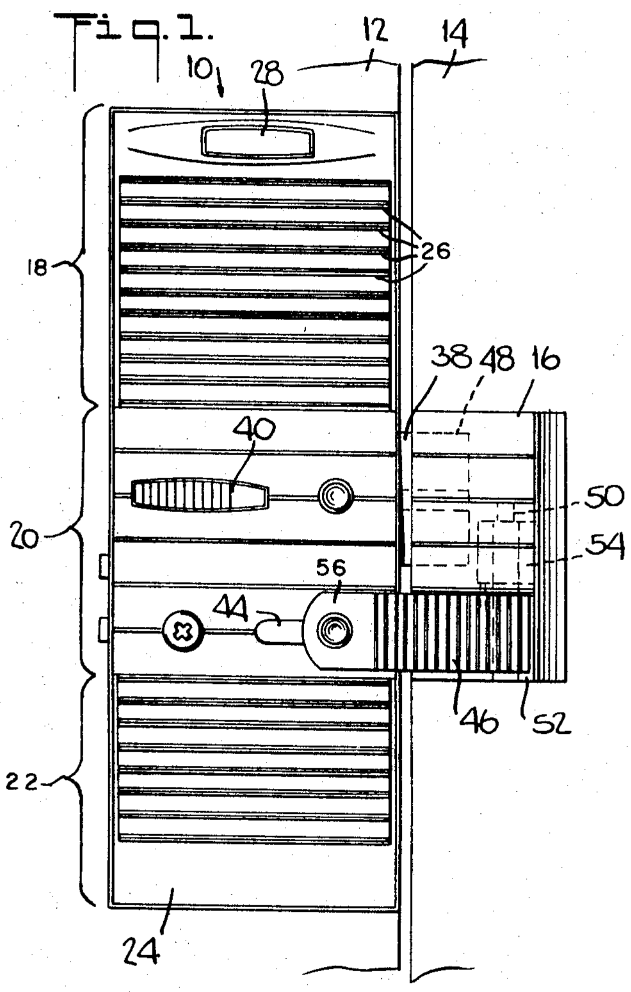
FIG. 1 is an elevational view of an alarm lock arrangement forming a first embodiment of the invention.
Figure 2:
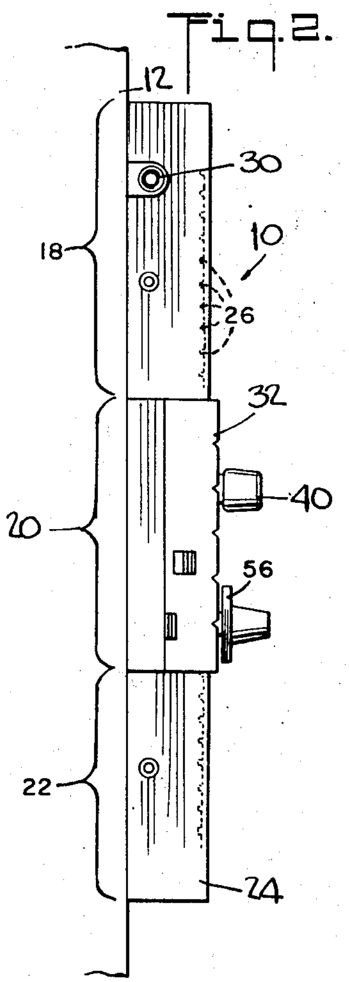
FIG. 2 is a side view of the embodiment of FIG. 1.

The embodiment shown in FIGS. 1–6 is adapted for use on presently existing doors, and does not require any modification of the door locking or latching mechanism. As shown in FIGS. 1 and 2, there is provided an alarm lock unit 10 which is affixed to a door 12 near its outer edge. The door 12 closes into a door casing or frame 14. A bolt receiving housing 16 is mounted on the casing 14 so that it will be adjacent the unit 10 when the door 12 is closed as shown in FIG. 1.

The alarm lock unit 10 is divided into three separate regions, known respectively as the alarm region 18, the lock region 20 and the power supply region 22. The alarm region 18 contains an electrically powered acoustical alarm and various electrical circuits to be described more fully hereinafter. As shown in FIGS. 1 and 2, there is provided a cover 24 over the alarm region 18 and this cover has louvers 26 formed therein through which the alarm sounds are emitted. An emergency button 28 is also provided; and as will be explained, this button when pressed will initiate alarm operation, thus providing a special emergency feature. A telephone jack 30 (FIG. 2) is provided on the side of the unit 10. This jack permits the use of remote signalling systems which are actuated along with the alarm unit. Thus for example a telephone arrangement may be provided which would automatically call a fire department or police station. When the alarm is set off.

Figures 3, 4:
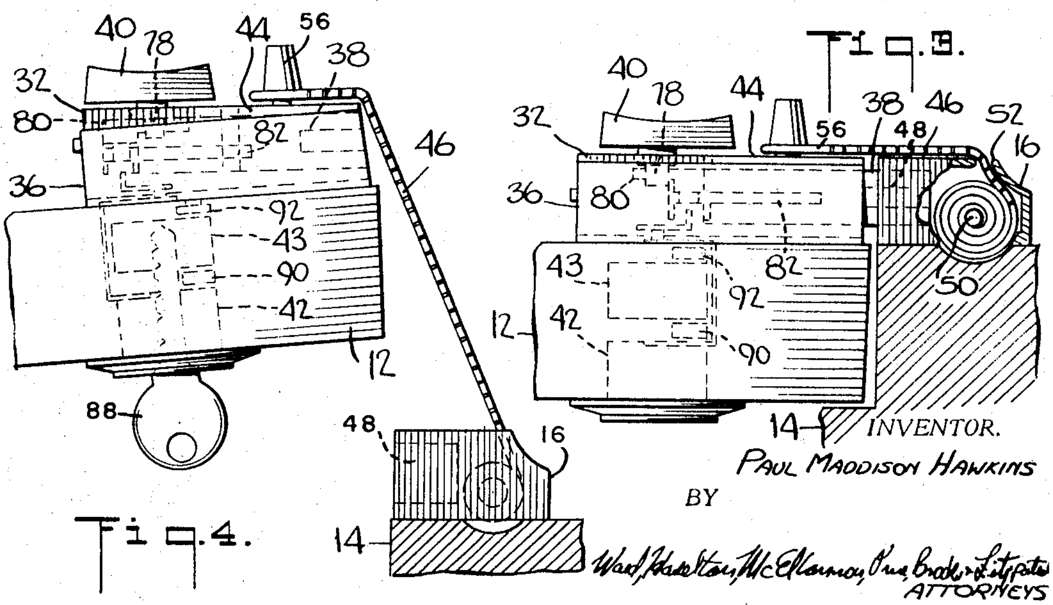
FIG. 3 is a section view taken along line 3—3 of FIG. 1.
FIG. 4 is a view similar to FIG. 3 but showing the sytem as reacting to a forcing condition.

The lock region 20 includes a frame member 32 which, as shown in FIGS. 3 and 4, is mounted for limited pivotal movement away from the surface of the door 12. The frame member 32 is mounted on a casing 36 which is affixed to the door 12. A bolt 38 is arranged between the case 36 and frame member 32 for reciprocal movement whereby it projects into and back from the bolt receiving housing 16 for locking and unlocking the door. The bolt movements are controlled from inside the door 12 by means of a thumb turn 40. A first cylinder assembly 42 extends through the door 12 and is arranged to permit key operation of the bolt 38 from outside the door. There is additionally provided a groove 44 on the frame member 32 for anchoring the end of a strap lock element 46.

The bolt receiving housing 16 as shown in FIGS. 1 and 3 is provided with a recess 48 for receiving the bolt 38 from the alarm lock unit 10. There is additionally provided an axle 50 mounted for rotation inside the housing 16. The strap lock element 46 is attached at one end to the lower portion of the axle 50, and protrudes out through a slot opening 52 in the housing. A bias spring 54 is connected to the axle 50 near its upper end and tends to rotate the axle to a point where the strap lock element is fully wound up on it. The other end of the strap lock element is provided with an anchor element 56 which fits into the groove 44 in the alarm lock unit 10.

Figures 5, 6, 7:
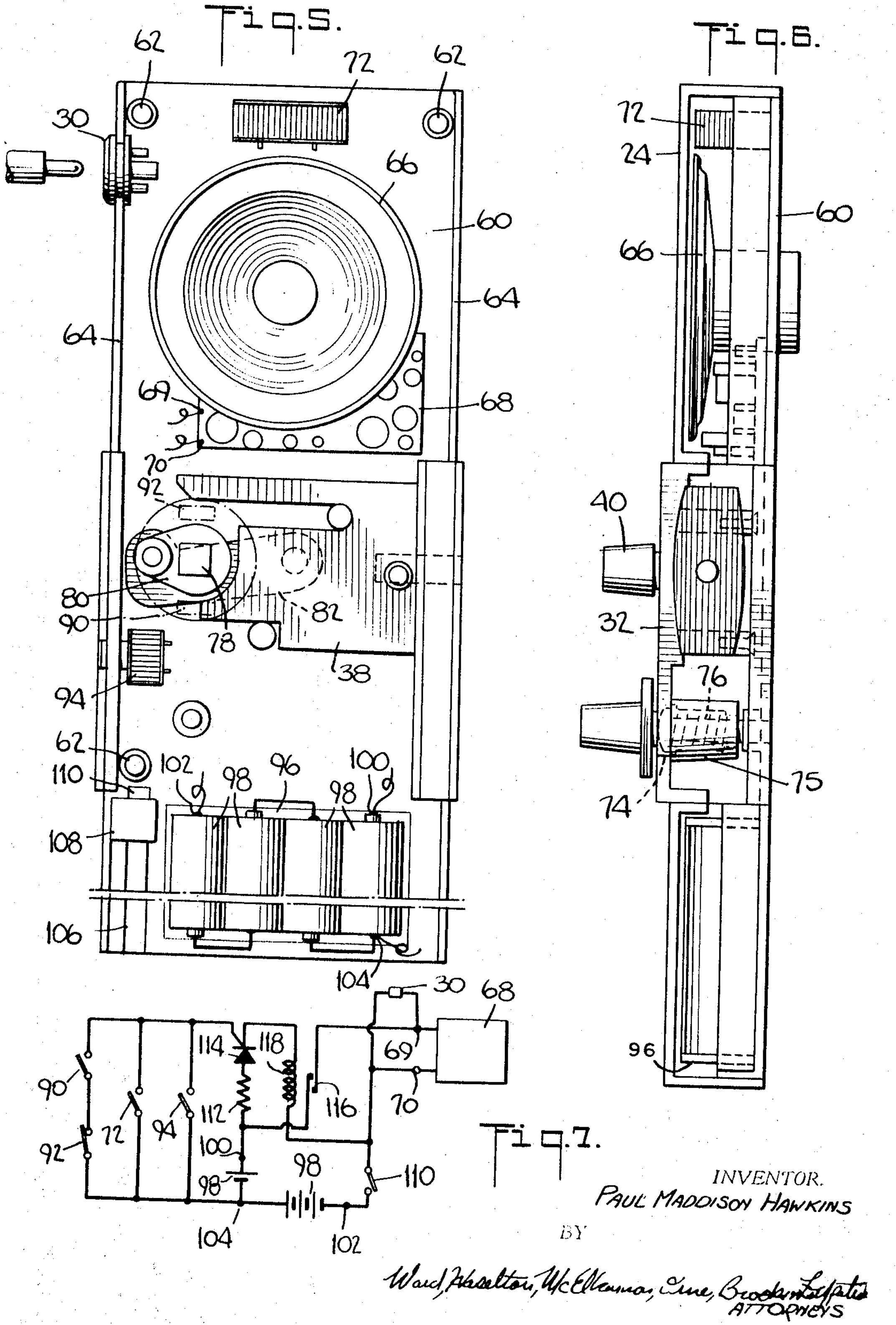
FIG. 5 is an elevational view of the interior of the embodiment of FIG. 1.
FIG. 6 is a side view of the interior of the embodiment of FIG. 1.
FIG. 7 is a circuit diagram of the electrical components of the embodiment of FIG. 1.

FIGS. 5 and 6 show in greater detail the internal construction of the alarm lock unit 10. As can be seen there is provided an elongated base plate 60 which extends over the length of the unit 10 and which is mounted flat against the door 12 by means of bolts or the like which extend through holes 62. The casing 36 in the lock region 20 forms a portion of the base plate 60.

In the alarm region 18, the base plate 60 is formed with flange like arms 64 on which the cover 24 is mounted. One of the flange like arms additionally serves to mount the telephone jack 30. An alarm loudspeaker 66 is mounted on the base plate 60 in the alarm region 18, and a circuit module 68 is also mounted in the alarm region 18 adjacent the loudspeaker 66. The circuit module 68 may be an electrical oscillator, preferably of a transistorized variety, which is capable of producing electrical signals which vary in the acoustical range. These signals are converted to alarm sounds in the loudspeaker 66. Electrical energy is supplied to the module 68 via a pair of input terminals 69 and 70.

An emergency switch 72 is mounted immediately above the loudspeaker. This switch is of the normally open type and is arranged to be closed by depression of the emergency button 28.

In the lock region 20, the frame member 32 as stated above, is mounted for limited pivotal movement on the casing 36. A spring 74 (FIG. 6) is set in a cup shaped formation 75 on the frame member 32 and is held down in the cup shaped formation by the head of a shank member 76 which extends up from the casing 36 through the bottom of the cup shaped formation and through the spring 74. The spring is thus placed under compressive stress and it serves to hold the frame member 32 in flush position as shown in FIG. 3. However when the door 12 is forced, if either the bolt 38 is projected or the strap lock element 46 is anchored in the groove 44, the resistance offered by the bolt or strap lock element will urge the frame member 32 against the spring 74 so that it pivots to the position shown in FIG. 4. This pivotal movement, as will be explained more fully hereinafter, serves to activate the alarm.

The bolt 38, as mentioned above, is controlled by the thumb turn 40 and by the cylinder assembly 42. As can be seen in FIGS. 3, 4 and 5, the thumb turn 40 turns a square shank 78 to which is atached a crank arm 80. A lever 82 is pivotally connected to the crank arm 80 and to the bolt 38 and converts the turning movement of the former to translational movement of the latter.

In addition to the first cylinder assembly 42, there is provided a second cylinder assembly 43. The two cylinder assemblies 42 and 43, as shown in FIGS. 3 and 4, are arranged in tandem so that a single elongated key 88 can extend into both at the same time. At least one of these cylinder assemblies is connected to the bolt operating lever 82 so that a key which fits into such cylinder may be enabled to operate the bolt 38.

Each of the key cylinder assemblies 42 and 43 is provided with an associated switch 90 and 92 which is controlled by the turning of the cylinder. The first switch 90, which is associated with the first or bolt connected cylinder assembly 42 is arranged to be opened condition when the cylinder is turned to project the bolt 38, and to be in closed condition when the cylinder is turned to retract the bolt. The second switch 92, which is associated wtih the second cylinder assembly 43, is arranged to be closed when its cylinder is turned to a position corresponding to the bolt retraction position of the first cylinder assembly 42; and to be opened when its cylinder is turned to a position corresponding to the bolt projection position of the first cylinder.

A forced entry switch 94 is mounted on the casing 36 and is connected to the frame member 32 to be opened when the frame member is in its flush position as shown in FIG. 3, and to be closed when the frame member is forced to its outwardly pivoted position as shown in FIG. 4.

The power supply region 22 is provided with a battery mounting clip 96 in which are placed four one and one-half volt battery cells 98. As shown schematically, the cells 98 are arranged in the clip such that they are connected in series to provide a total of six volts across them. There is provided a positive terminal connection 100 at the positive terminal of the lead cell, and a negative terminal connection 102 is provided at the negative terminal of the last cell. An intermediate terminal connection 104 is also provided between the negative terminal of the lead cell and the positive terminal of the next adjacent cell.

A keyway 106 is provided in the bottom of the power supply region 22 and a turn off cylinder 108 is located deep inside this keyway. The distance of the cylinder 108 from the bottom of the keyway 106 is such that only a key long enough to operate the second cylinder 86 will operate the turn off cylinder 108. The cylinder 108 in turn is coupled to open and close the contacts of a turn off switch 110.

The various electrical connections between the battery terminal connections, the switches and the alarm circuit module 68 are best seen in the schematic of FIG. 7.

As shown in FIG. 7, the positive terminal connection 100 is connected to a resistor 112 which in turn is connected to the anode of an electronic switch such as a silicon controlled rectifier 114. The terminal connection 100 is also connected to one contact of a magnetically operated normally open reed switch 116. The other contact of the switch 116 is connected to the input terminal 69 of the alarm module 68. The negative terminal connection 102 is connected to the turn off switch 110; and the other side of this switch is connected to the other input terminal 70 of the alarm module 68. The terminal 70 in turn is connected to one end of a coil 118 which operates the reed switch 116. The other end of the coil 118 is connected to the cathode of the silicon controlled rectifier 114.

The intermediate terminal connection 104 is connected to one terminal of each of the forced entry switch 94, the emergency switch 72 and the key switch 92. The other terminal of the key switch 90 is connected to one terminal of the key switch 92, and its other terminal in turn is connected together with the other terminals of the forced entry switch 94 and the emergency switch 72, is connected to the gate terminal of the silicon controlled rectifier 114. The telephone jack 30 is connected across the terminals 69 and 70 of the alarm module 68 to receive electrical energization whenever the alarm is energized.

The above described system operates in the following manner:

When the door 12 is closed into its frame 14, it may be closely locked by throwing the bolt 38. This may be done from inside by means of the thumb turn 40, or it may be done from outside by means of a key which operates the cylinder assembly 42. The door 12 may also be locked loosely by use of the strap lock element 46, i.e., by fitting its anchor element 56 into the groove 44.

Should the door 12 be forced while locked either closely or loosely, such forcing, if of sufficient magnitude, will tilt or pivot the frame member 32 and close the forced entry switch 94. It will be appreciated that in the one case, the tilting action results from pressure of the bolt 38 against the bolt housing 16 (close or bolt locked condition), while in the other case, the tilting action results from pulling of the strap lock element 46 (loose or strap locked condition).

At this point, it will be noted that the silicon controlled rectifier 114 is connected in closed circuit arrangement across the positive and negative battery terminal connections 100 and 102. However, the silicon controlled rectifier 114 will not pass current until an intermediate voltage is applied to its gate terminal. This occurs when the forced entry switch 94 is closed by a forcing action as above described. Once the silicon controlled rectifier 114 begins to conduct, current will flow through the coil 118 and this in turn will close the normally opened contacts of the reed switch 116 thus connecting the alarm module terminals 68 and 69 across the positive and negative battery terminal connections 100 and 102. The action of the silicon controlled rectifier 114 is such that it will remain conducting even after the intermediate voltage on its gate terminal is removed. Thus the alarm will remain energized even if the forced entry switch 94 is opened following termination of the forcing action. The alarm may be turned off only by insertion of an elongated key into the keyway 106 to turn the turn-off cylinder 108 and open the turn-off switch 110. This breaks the main circuit between the battery and the alarm. Once the alarm is turned off, the turn-off switch 110 may be closed, and so long as no intermediate voltage remains on the gate terminal of the silicon controlled rectifier, the alarm will not turn on.

The system also provides for maximum security protection whereby the alarm will be set off by any unauthorized retraction of the bolt 38. This is avoided by insertion of an elongated key 120 into the two cylinders 42 and 43, as shown in FIG. 4, and turning the key to operate both cylinders while projecting the bolt 38. As a result, the two associated cylinder switches 90 and 92 are closed and opened by the turning of their associated cylinders 42 and 43. More specifically, this locking movement of both cylinders causes the switches 90 and 92 to be switched to opposite conditions.

Thus, when the bolt 38 is thrown so that it projects into the bolt receiving housing 16 so as to lock the door 12, the two cylinder assemblies 42 and 43 are rotated to positions such that the switch 92 associated with the innermost cylinder assembly 43 is closed while the switch 90 associated with the outermost cylinder assembly 42 is opened. Now when, as shown in FIG. 4, the elongated key 120 is inserted into the door 12 from the outside thereof, it will project completely through the cylinder 42 and into the cylinder 43, so that upon turning of the key 120 both cylinders are rotated. Accordingly, both the associated switches 90 and 92 will change conditions so that while switch 90 closes by this key turning movement, the switch 92 will open. Thus during retraction of the bolt 38 by means of the elongated key 120, the circuit via the switches 90 and 92 to the gate terminal of the silicon control rectifier 114 will remain open and the rectifier switch 114 will not be actuated. On the other hand, should a shortened key be utilized to operate the bolt connected cylinder 42, or should the bolt 38 itself be retracted by some forcing action which in turn would cause rotation of the cylinder 42, the associated switch 90 would change condition while the switch 92 would remain in its original condition. Thus, the switch 92 would remain closed and the bolt retraction movement of the cylinder 42 would cause the switch 90 to close. This then completes a circuit through the switches 90 and 92 to the gate terminal of the silicon control rectifier 114. The rectifier thereby becomes conductive and allows current to flow through the relay coil 118 so that the alarm 68 will be actuated.

FIGS. 8–17 show a modified version of the subject invention adapted for integral mounting with a door and its frame or mortise. The arrangement of this embodiment is particularly well suited to new constructions whereby the various components making up the lock and alarm assembly are built into the door itself and into the mortise or casing surrounding the door so that no significant change in appearance results from the presence of this arrangement.

Figure 8:
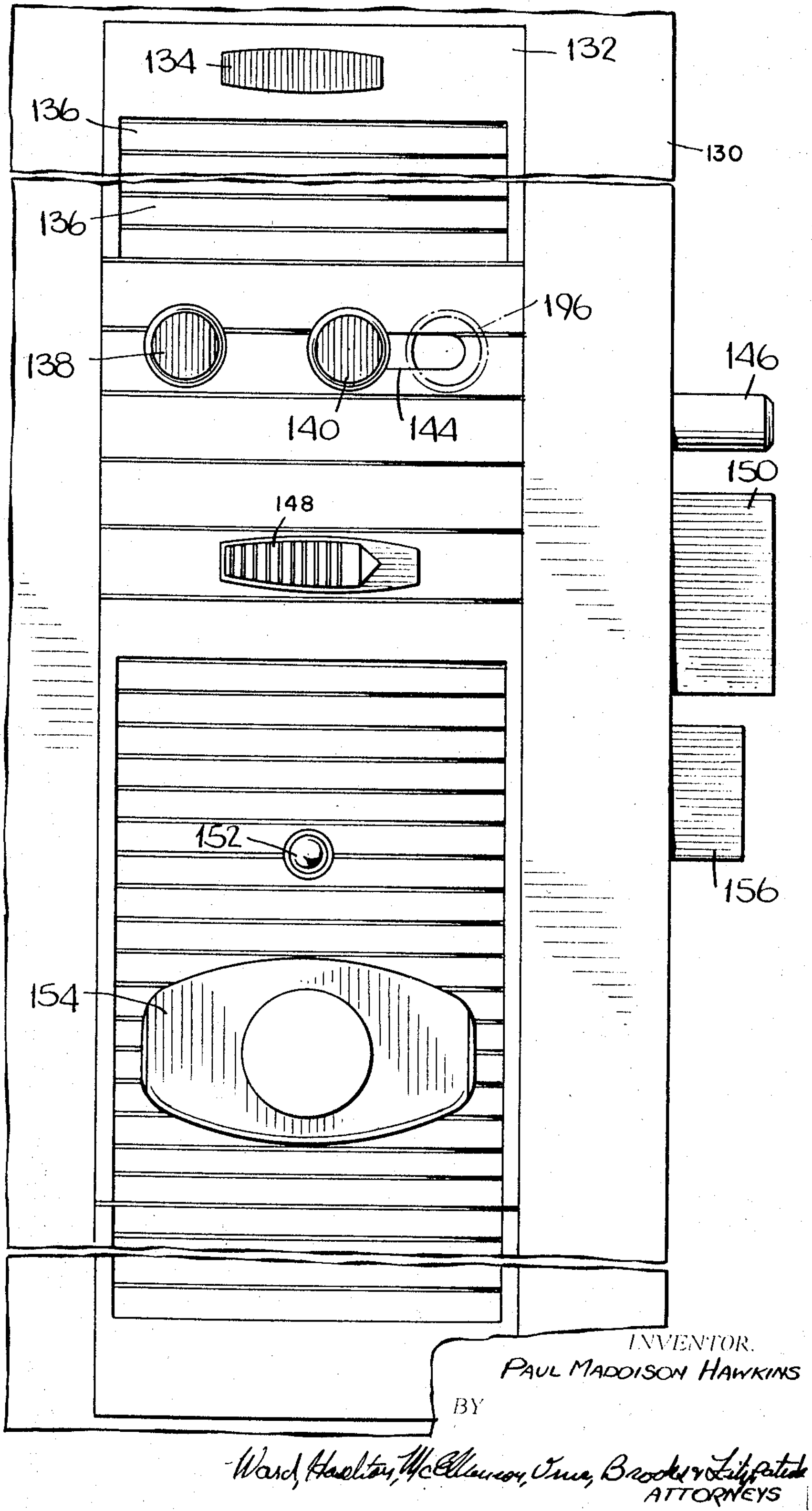
FIG. 8 is a front elevational view of an alarm-lock arrangement forming a second embodiment of the invention shown with its cover plate in place.

As shown in FIG. 8 there is provided a cover plate 132 on the inside of a door 130. Near the upper central portion of the cover plate 132 there is provided an emergency button 134 which may be pushed to sound an alarm, as will be described more fully hereinafter. Immediately below the emergency button 134 there is provided a series of louvers 136 through which audio alarm signals are emitted. As will be explained, an alarm unit for generating the acoustical alarm signals is positioned immediately behind the louvers 136.

Below the louvers 136 there is provided a maximum security button 138 which, when pushed inwardly, serves to prevent operation of the door lock or movement of its bolt so that such maximum security is obtained that not even a legitimate key may be used from outside the door 130 to open it. Immediately to the right to the maximum security button 138 there is provided a chain anchor handle 140 which is spring biased against the cover plate 132, but which may be pulled up slightly away from the plate and moved along a horizontal slot 144. This movement along the slot 144 causes a chain anchor bolt 146 to move outwardly to engage a chain anchor in a manner to be described.

A thumb-turn 148 is positioned below the maximum security button 138 and the chain anchor 140. This thumb-turn 148 may be turned to control the projection and retraction of a locking bolt 150 to achieve locking of the door 130.

Directly below the thumb-turn 148 there is provided an indicating window 152. Means are provided to illuminate this window whenever the bolt 150 is in its retracted position. Thus a person inside the door 130 may be apprised of the fact that the door is not locked whenever the indicating window 152 is illuminated. A door knob 154 is located below the indicating window 152 and serves to operate a door latch 156 to hold the door 130 in closed condition when it is not locked.

The mortise arrangement thus far described performs a number of integrated functions as follows:

(a) It achieves an emergency alarm by the pressing of the emergency button 134;

(b) It maintains the bolt 150 in projected condition for maximum security such that not even a legitimate key may be used to open the door whenever the maximum security button 138 is pushed inwardly;

(c) It provides chain anchoring by movement of the chain anchor handle 140 in a rightward direction, and at the same time provides an alarm whenever the door opening force produced via the chain anchor 146 exceeds a predetermined amount;

(d) It permits projection and retraction of the locking bolt 150 by means of the thumb-turn 148, and at the same time it provides an alarm whenever the door opening force on the projected bolt 150 exceeds a predetermined amount;

(e) It provides an indication via the indicating window 152 of the projection and retraction of the bolt 150; and (f) It permits operation of the door latch 156 by means of the knob 154.

Figure 9:
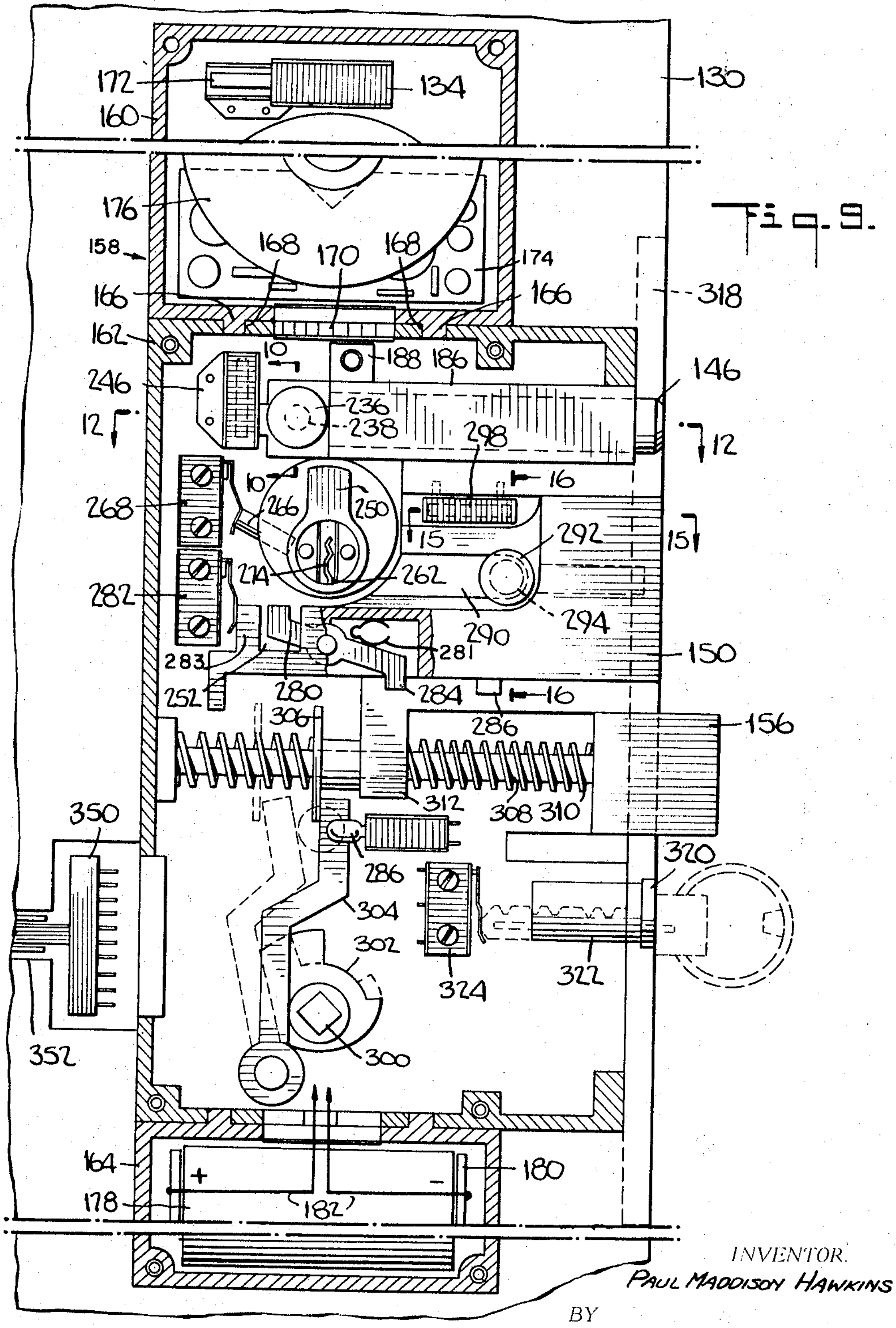
FIG. 9 is a view similar to FIG. 8 but showing the alarm-lock arrangement with its cover plate removed.

The mechanical construction of the various elements which cooperate to produce the above described effects are seen in FIGS. 9–16. As shown in FIG. 9, there is provided within a recess 158 in the door 130, an upper, a central and a lower housing identified respectively as 160, 162 and 164. These housings are of module-like construction and may be plugged into or removed from one another depending upon the requirements of the particular installation. Thus for example, the upper housing 160 is provided with a pair of locating lugs 166 which fit into corresponding openings 168 in the top of the central housing 162. There is additionally provided electrical plug connector means 170 for achieving electrical interconnection between the upper and central housings 160 and 162.

Inside the upper housing 160 there is provided a normally opened electrical emergency switch 172 which is arranged to be actuated by the emergency button 134. There is additionally provided within the upper housing 160, an electrical alarm generating circuit 174 which actuates a loudspeaker 176 for generating acoustical alarm signals.

The lower housing 164 is provided with a plurality of batteries 178, which are mounted in a battery clip 180 in such a manner that they are electrically connected in series. A pair of battery power supply wires 182 extends through an electrical plug connector 184 and into the central housing 162.

Figure 10:
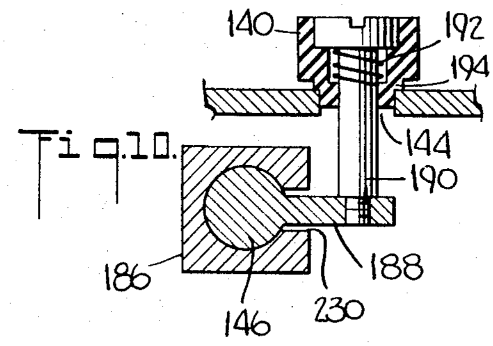
FIG. 10 is a view taken along lines 10—10 of FIG. 9.

Inside the central housing 162 there is provided an elongated bolt guide 186 of generally tubular construction and along through which the chain anchor bolt 146 may slide. The chain bolt 146, as shown, is provided with an upwardly extending lug 188 at the left end thereof. This lug proceeds up through a slot formed along the chain bolt guide 186 so as to allow the chain bolt 146 to move back and forth. The chain anchor handle 140 is attached to the lug 188 so that the chain bolt 146 may be operated by means of the handle 140. As shown in FIG. 10, the chain anchor handle 140 is of tubular configuration and fits about the head of a pin 190 which extends through the horizontal slot 144 of the plate 132, and is then threaded into the projecting lug 188 of the chain anchor bolt 146. A compression spring 192 is positioned between the underside of the head of the pin 190 and a shoulder 194 within the handle 140. This spring serves to urge the handle 140 in a downward direction into the horizontal slot 144. As illustrated in FIG. 8, however, the horizontal slot 144 is of such configuration that when the chain anchor bolt 146 is projected to the right, the handle 140 will be urged by the compression spring 192 down into an enlarged region 196 at the right end of the horizontal slot 144.

As a result of the above described arrangement a latching effect is achieved whereby when the chain anchor handle 140 is moved to the right to project the chain anchor bolt 146, the handle 140 will become lodged in the enlarged portion 196 of the horizontal slot 144 so that the bolt 146 cannot be moved back or retracted unless and until the chain anchor handle 140 is pulled back against the compression spring 192 so that it will be freed to move back along the horizontal slot 144.

Figure 11:
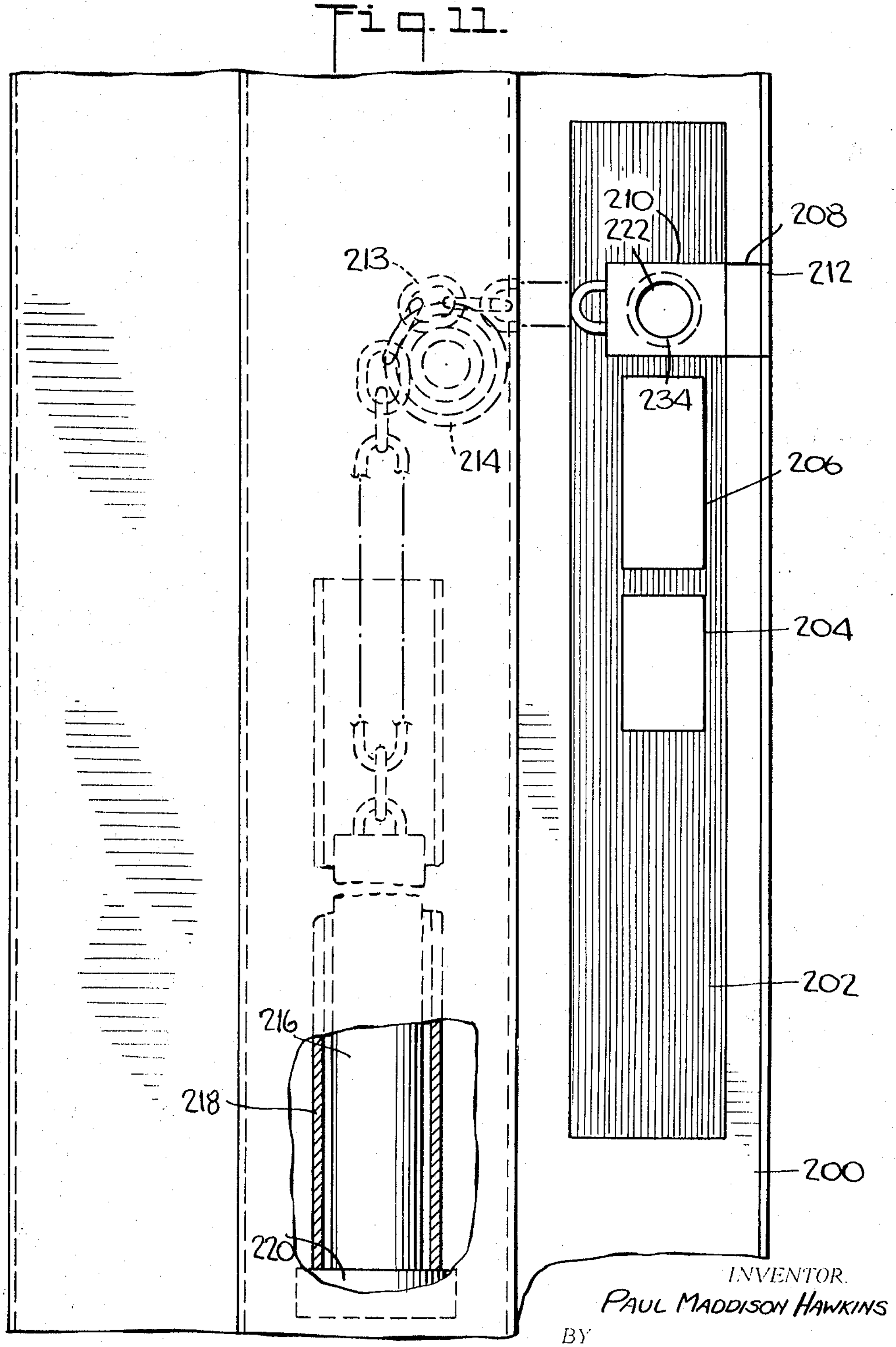
FIG. 11 is an end elevational view of a mortise and striker plate assembly used in conjunction with the arrangement of FIG. 8.

The rightward movement or projection of the chain bolt 146 causes it automatically to become engaged and securely attached to one end of a chain lock arranged in the mortise in which the door 130 is hung. As shown in FIG. 11, a portion of a mortise 200 is shown having a striker plate 202 mounted to face the edge of the door 130 when it is closed. The striker plate 202 is provided with a latch receiving opening 204 and a main bolt receiving opening 206 located respectively in alignment with the latch 156 and the main locking bolt 150 to receive these members when they are projected as above described. Immediately above the main bolt receiving opening 206 there is provided a chain anchor recess 208 into which is fitted a block-like chain anchor 210. The chain anchor recess 208 opens out to the side of the mortise 200 as indicated at 212 so as to allow outward movement of the chain anchor 210. The chain anchor 210 has attached thereto an elongated chain 212 which extends into the mortise 200 and around a pulley 214 down to a weight element 216. The weight element 216 is guided in a fixed tubular guide 218 for up and down movement as the chain anchor 210 is moved in and out of its recess 208. A lower flange 220 is attached to the bottom of the weight 216 and engages the guide 218 when the chain anchor 210 has been pulled out away from the mortise 200 by a predetermined amount. This limits the extent to which the chain anchor 210 may move, and of course the extent to which the door 130 may be opened when the chain anchor 210 is engaged.

Figure 12:
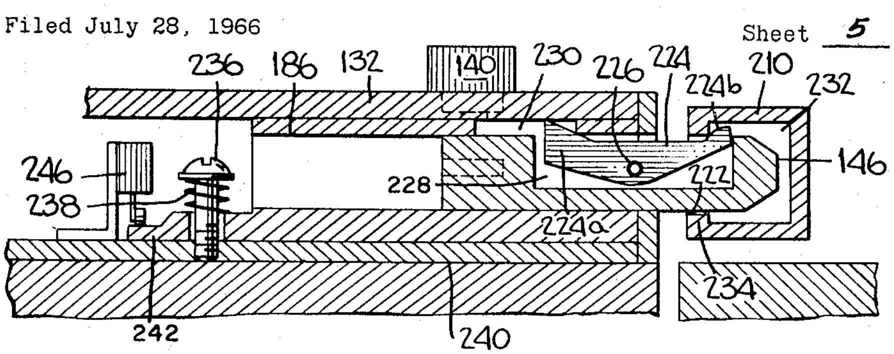
FIG. 12 is a view taken along lines 12—12 of FIG. 9.

The chain anchor 210 is continuously urged toward its position shown in FIG. 11 by virtue of the downward pull exerted by the weight element 216. In this normal position the chain anchor 210 is aligned with the chain anchor bolt 146. Thus, when as shown in FIG. 12, the chain anchor bolt 146 is projected to the right it will extend into an opening 222 in the chain anchor 210. Thus when the chain anchor handle 140 is moved to the right to project the chain anchor bolt 146, the chain anchor 210 will automatically become engaged by the bolt so that the door 130 will be effectively connected to the mortise 200 via the chain 213.

FIG. 12 additionally shows special provision for insuring that the chain anchor bolt 146 is fixedly connected to the chain anchor 210 when it is in its projected condition. As shown in FIG. 12, there is provided a cam element 224 which is pivotally mounted by means of a pin 226 to rock about the pin within a slot or recess 228 in the chain anchor bolt 146. When the chain anchor bolt 146 is in its leftward or retracted position, the left end **224*a* of the cam element 224 extends up through a slot 230 in the chain anchor bolt guide 186. At the same time, the right end 224*b* of the cam element 224 is retracted into the slot or recess 228 so that the chain anchor bolt 146 may project into the opening 222 in the chain anchor 210. Movement of the chain anchor bolt 146 in a rightward or projecting direction into the chain anchor 210 however will cause the left end 224*a* of the cam element 224 to engage the edge of the slot 230 so that further projecting movement of the chain anchor bolt 146 will cause the cam element 224 to pivot in a counter clockwise direction thus raising or projecting its right end 224*b*. As shown in FIG. 12, the chain anchor 210 is provided with an enlarged region 232 inside the opening 222. This enlarged region forms a lip 234 around the opening 222 and this lip 234 is thereby engaged by the right end 224*b* of the cam element 224. This then prevents the chain anchor 210 from being removed from the end of the chain anchor bolt 146** when it is engaged therewith.

The chain anchor bolt arrangement of the present invention, as indicated previously, provides for the automatic sounding of an alarm when the door opening force applied to the door 130 exceeds a predetermined amount. This is accomplished by utilizing the resulting tension upon the chain 213 to exert a pulling force through the chain anchor bolt 146 to the chain anchor bolt guide 186. As shown in FIG. 12, the left end of the chain anchor bolt guide 186 is held by means of a screw 236 and a compression spring 238 against the bottom surface 240 of the central housing 162. When the force exerted from the chain 213 through the chain anchor 210 and the chain anchor bolt 140 becomes sufficiently high, the chain anchor bolt guide 186 will tend to pivot in a clockwise direction against the action of the compression spring 238. As a result of this movement a lug 242 on the extreme left end of the chain anchor bolt guide 186 will engage and close a normally opened chain anchor mico-switch 246. The opening of this switch 246, as will be explained more fully hereinafter will serve to actuate an alarm.

Figures 13, 15, 16:
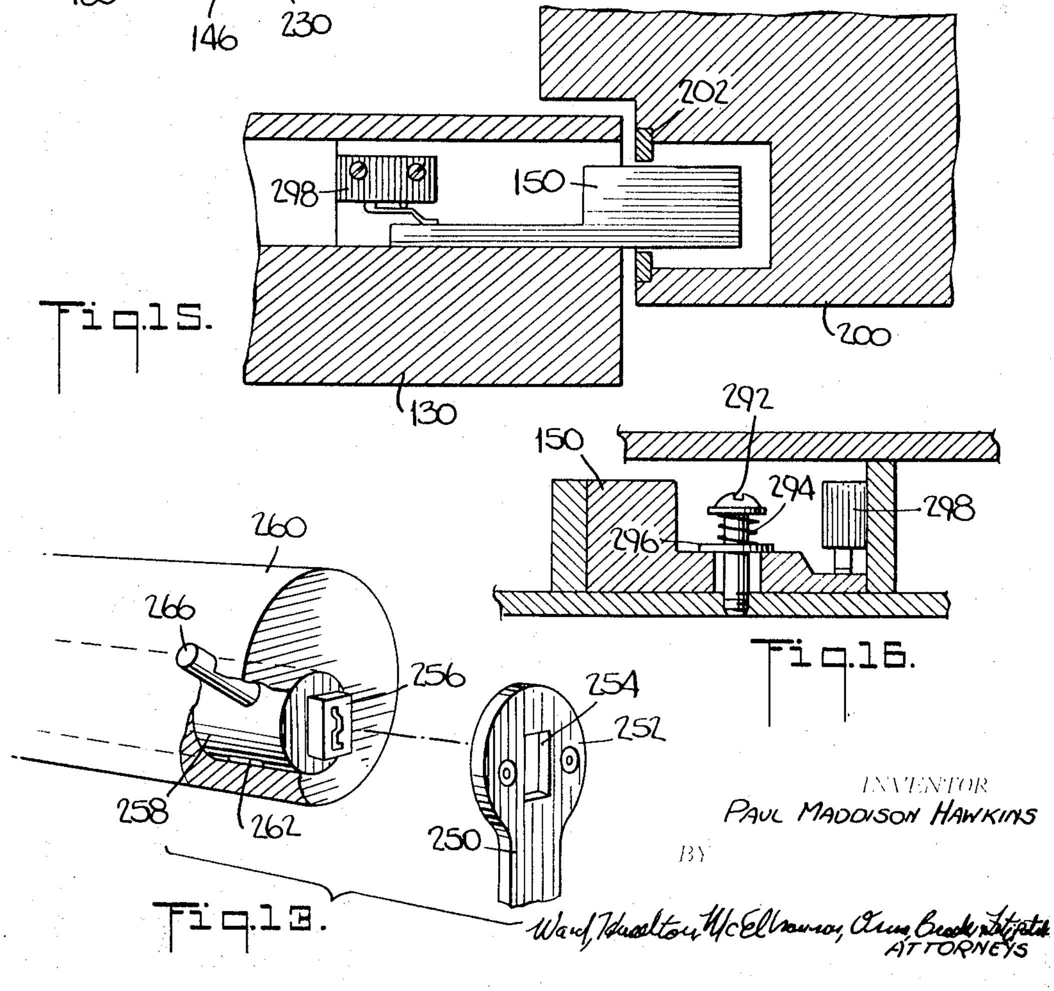
FIG. 13 is an exploded perspective view, partially cut away, illustrating a portion of the arrangement of FIG. 9.
FIG. 15 is a view taken along lines 15—15 of FIG. 9.
FIG. 16 is a view taken along lines 16—16 of FIG. 9.

The main locking bolt 150, as shown in FIG. 9, is guided in the central housing 162 for reciprocal movement back and forth between projected and retracted positions. This projection and retraction is achieved by the interaction of an operating cam 250 with a slot 254 in the left portion of the main locking bolt 150. The operating cam 250 as shown in FIG. 13, is formed on a disc 252 which fits over a corresponding projection 256 at one end of a revolving plug 258. The revolving plug 258 are of special construction but are readily obtained operated from outside the door 130 by means of a key as will be explained. The lock cylinder 260 and plug 258 are of special construction but are readily obtained by minor modifications to conventional cylinder-type lock arrangements.

Figures 14, 17:
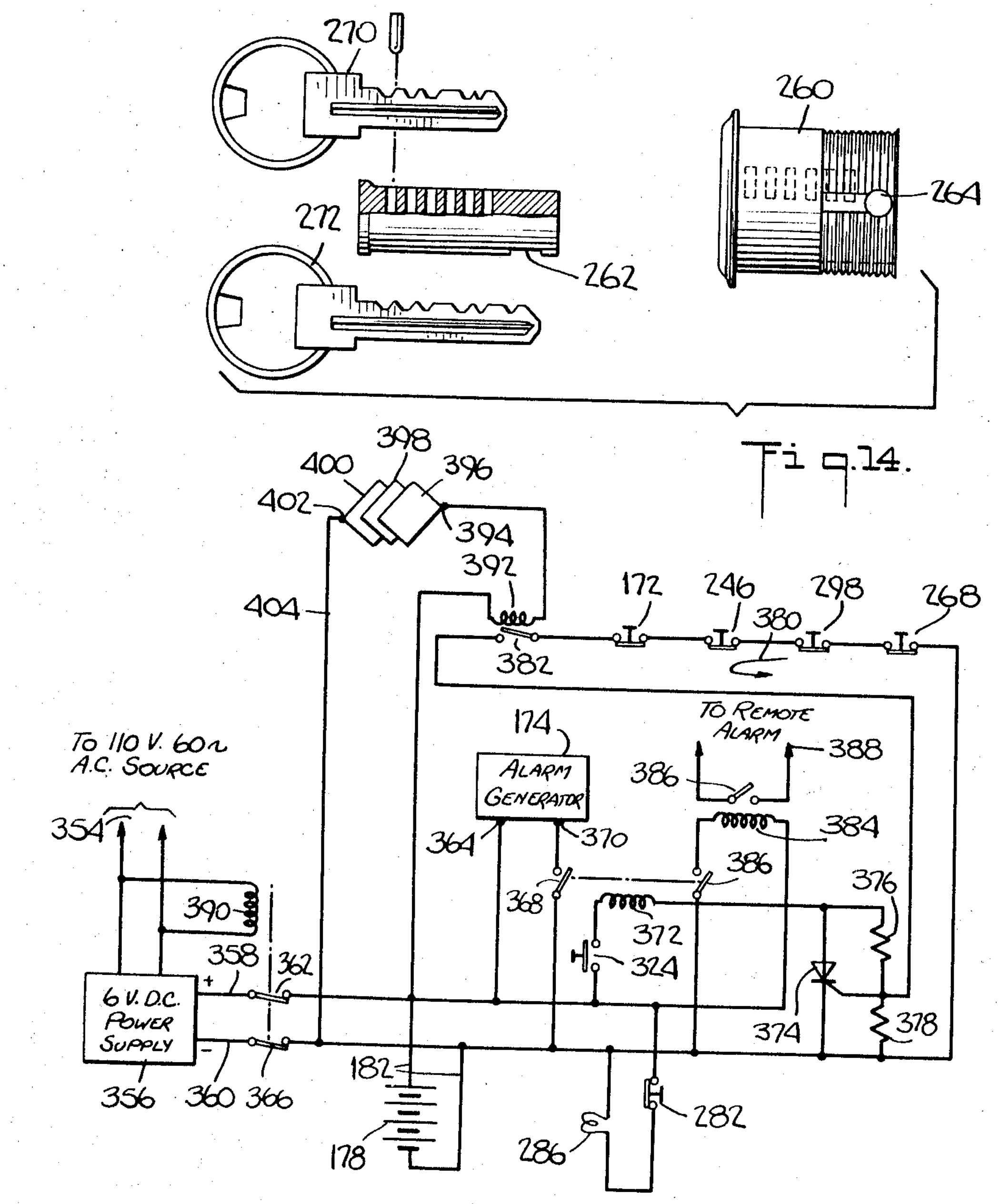
FIG. 14 is an exploded side elevational view illustrating the relationship of parts in a portion of the embodiment of FIG. 9.
FIG. 17 is a circuit diagram illustrating the wiring arrangements utilized in connection with the embodiment of FIG. 9.

As shown in FIG. 14, the right end of the revolving plug 258 (the end toward the inside surfaces of the door 130) is provided with a flattened region 262. Also, the lock cylinder 260 is provided with a generally radially extending pin hole 264 at a corresponding axial position to the flattened region 262 of the revolving plug 258. A steel pin 266 extends into the pin hole 264 and contacts the surface of the revolving plug 258. The outer end of the pin 260, as shown in FIG. 9, contacts the movable arm of a security micro-switch 268.

The above described security micro-switch and lock actuating arrangement operates in the following manner. When a conventional key such as a key 270 (FIG. 14) is inserted into the revolving plug 258, its inner end does not reach the flattened region 262 of the revolving plug. The key 270 however will serve properly to align the various lock pins (not shown) so that the plug 258 may be rotated within the cylinder 260; and accordingly the cam 250 will move around to engage the slot 252 of the main locking bolt 150 and will move it back and forth. However, during the course of such rotative movement, the steel pin 266 will eventually engage the flattened region 262 of the revolving plug 258 and will thereby be permitted to move inwardly under the force of the movable arm of the security micro-switch 268. Such inward movement is accompanied by movement of the switch arm. As a result the security micro-switch 268 will open, and, as will be descriebd hereinafter such switch opening will actuate the alarm. Now when a special elongated key, such as key 272 (FIG. 14), is inserted into the revolving plug 258, it will extend beyond the flattened region 262. Accordingly, when the revolving plug 258 is rotated and its flattened region 262 is brought around to the angular position of the steel pin 266, the steel pin 266 will be held outwardly from the flattened region by the presence of the end of the key 272. This is because, as shown in FIG. 9, the key passes through a key slot 274 in the plug which is aligned with the flattened region 262. Thus the edge of the key will serve to hold the pin 266 in the position it would occupy were the flattened region 262 not present.

It will be appreciated that with the above described arrangement a single cylinder may be used to effect substantially the same results achieved with the two cylinder arrangement of the preceding embodiment. Thus, it may be possible to allow persons other than the tenant of an apartment or other protected enclosure to have shortened keys which will allow entry into the apartment or enclosure for emergency purposes. However such shortened keys, while being capable of opening up the apartment or enclosure, will be unable to do so without actuating an alarm. This permits entry for legitimate purposes such as emergencies and the like and yet will preclude any promiscuous entry of the apartment or enclosure by a person who has been entrusted with a key.

The main locking bolt 150 may, of course, be operated from the inside by the thumb-turn 148 completely independently of the security micro-switch 268. This is achieved by providing the thumb-turn 148 with an operating cam of its own (not shown) which operates in very close proximity to the operating lug 250 mounted on the revolving plug 258; and which like the cam 250, engages the bolt slot 252.

The main locking bolt 150 has pivotally mounted thereon a position securing element 280. This position securing element is biased by means of a leaf spring 281 so that its right end moves in a downward direction. The left end of the position securing element 280, as shown in FIG. 9, is aligned with the slot 252 in the main locking bolt 150. The right end of the position securing element 280 is arranged to fit into either of two detents 284 and 286 formed in the central housing 162. When the bolt 150 is in its retracted or unlocking position as shown in FIG. 9, the right end of the position securing element 280 is engaged in the left detent 284 thus preventing any movement of the main locking bolt 150. When however the bolt 150 is to be projected either by the operating lug 250 or the corresponding operating lug on the thumb-turn 148, the lug will upon rotating down into the slot 252, contact the left end of the position securing element 280 causing it to rotate so that its right end comes out of the detent 284. Thereafer when the main locking bolt 150 achieves its fully projected position, the right end of the position sensing element will secure itself into the left detent 286, thus holding the main locking bolt 150 in its projected position. This precludes the possibility of protracting the bolt by means of lock picking devices.

There is additionally provided a bolt condition sensing micro-switch 282 whose contact arm is held in closed condition by a lug 283 on the left end of the main locking bolt 150 when the bolt is in its retracted position. This closing of the contacts of the bolt condition sensing micro-switch 282, as will be explained hereinafter, serves to turn on a bolt condition lamp 286 located immediately behind the indicating window 152.

Turning now to FIGS. 15 and 16, it will be seen that the main locking bolt 150 is provided with a horizontally extending slot 290 through which a bolt securing pin 292 (FIG. 16) extends. The bolt securing pin is threaded into the bottom surface 240 of the central housing 162. A compression spring 294 extends between the head of the pin 292 and a washer 296 as shown in FIG. 16. This allows the main locking bolt 150 to move back and forth between its projected and protracted positions. At the same time, it makes the bolt sensitive to forcing movement tending to open the door 130 when the bolt is in its projected position. When such forcing movement occurs, the left end of the bolt 150 as shown in FIG. 15, will be urged to move upwardly against the washer 296 and the compression spring 294. A main bolt micro-switch 298 is arranged with its contact arm to be engaged by such movement of the main locking bolt 150 so that the switch 298 will become opened when the forcing movement on the door exceeds a predetermined amount.

Toward the bottom of the central housing 162 there is provided a square shank 300 which is attached to the door knob 154. This square shank operates a cam element 302 which in turn causes a latch operating arm 304 to engage a flange 306 attached through a rod 308 to the latch 156. A latch extending compression spring 310 extends around the rod 308 between the latch 156 and a guide member 312 formed in the central housing 162. The spring 310 urges the latch 156 in a projected position, and the latch may be retracted by turning the cam element 302 so that the latch operating arm 304 pulls back on the flange 306 against the action of the compression spring 310. An additional compression spring 314 is provided on the opposite side of the flange 306 to cushion any excessively harsh opening movements applied through the door knob 154.

The chain anchor bolt 146, the main locking bolt 150 and the latch 156 each protrude through corresponding openings in a lock face plate 318 which is located flush with the edge of the door 130. There is additionally provided an opening 320 in the lower portion of the lock face plate 318. A lock cylinder insert 322 extends inwardly of the opening 320 to accommodate the elongated key 272 of FIG. 14. An alarm shut-off micro-switch 324 is positioned in alignment with the cylinder insert 322 so that its movable arm becomes engaged by the elongated key 272 when the key is pushed fully into the insert. It should be noted that the distance from the lock face plate 318 to the alarm shut-off micro-switch 324 is such that the short key 270 of FIG. 14 will not be effective to reach the alarm shut-off micro-switch 324 to turn off the alarm. It will additionally be noted that the door 130 must be opened to provide access to the cylinder insert 322 so that a key may be inserted therein to turn off the alarm.

At the back of the central housing 162 there is provided an additional electrical connector arrangement 350 through which electrical connections external to the above described system may be brought. These electrical connections proceed through a conduit passageway 352, a portion of which is shown formed in the door 130.

Turning now to FIG. 17, the electrical connections between the various switches and connectors will be seen in schematic arrangement. As shown, there are provided a pair of input wires 354 which are connected to a source of alternating current such as conventional 110 volt 60 cycle household current.

The wires 354 proceed to a converter arrangement 356 which rectifies and reduces the voltage so that there is produced across a pair of positive and negative supply wires 358 and 360 a continuous direct current at 6 volts. The positive wire 358 is connected via a first switch contact 362 to one terminal 364 of the electrical alarm generating circuit 174. The negative wire 360 is connected via a second relay control switch 366 and a relay controlled alarm actuating switch 368 to a second input terminal 370 of the alarm generating circuit 174. The various batteries 178 are also connected via wires 182, to the wires 358 and 360 to provide standby power in the event that the 110 volt AC 60 cycle household supply power supplied through the lines 354 should fail.

The bolt condition micro-switch 282 and the lamp 286 are also connected in series across the positive and negative wires 358 and 360. As above described, whenever the main locking bolt 150 is retracted it contacts the bolt condition micro-switch 282 causing it to close, thereby placing the lamp 286 in circuit with the power supply 356 so as to cause the lamp to illuminate the indicating window 152.

The electrical alarm generating circuit 174 will be activated whenever the relay controlled alarm actuating the switch 368 is closed. This occurs upon energization of an alarm actuating relay 372, and it will remain closed so long as that relay is being energized. The alarm actuating relay 372 is connected on one side to the positive wire 358 from the converter 356. The other side of the alarm-activating relay 372 is connected through the normally closed alarm shut-off micro-switch 324 to the anode of a silicon controlled rectifier 374. The cathode of the silicon controlled rectifier 374 is connected to the negative wire 360. A voltage divider circuit consisting of a pair of resistors 376 and 378 is connected across the anode and cathode of the silicon controlled rectifier 374; and the voltage at the junction of these two resistors is supplied to bias the gate terminal of the silicon controlled rectifier. The junction point between the two resistors 376 and 378 is additionally connected through a circuit loop, indicated generally at 380, to the cathode of the silicon controlled rectifier 374. Thus the gate terminal of the silicon controlled rectifier 374 is maintained by the loop 380 at cathode potential so long as the loop 380 remains intact. Should this loop be broken at any point, however, the voltage at the gate terminal of the silicon controlled rectifier 374 would rise to a voltage determined by a relative resistances of the two resistors 376 and 378. These resistances are set such that the voltage at the gate terminal of the silicon controlled rectifier would rise to a point whereby the silicon controlled rectifier would be triggered into its conductive condition thereby causing current to flow through the alarm actuating relay 372.

The circuit loop 380 is made up of the emergency switch 172, the chain anchor micro-switch 246, the main bolt micro-switch 298, and the security micro-switch 268, connected together in series. As shown in FIG. 17, there is provided an additional relay actuated penetration switch 382 connected in series with the various other switches of the loop 380. Whenever any of the switches making up the loop 380 are opened, even instantaneously, as by pressing the emergency button 134, by forcing the door 130 beyond its chain lock limit, by forcing the door 130 with its main bolt 150 projected, or by retracting the main bolt 150 with a shortened key 270, the gate voltage at the silicon controlled rectifier 374 will rise to trigger the rectifier thereby permitting current to flow through the alarm actuating relay circuit 372. The silicon controlled rectifier 374 provides an electrical latching effect. Thus should any of the switches in the loop 380, close after being opened, current will continue to pass through the loop, the silicon controlled rectifier 374 will continue to pass current thus keeping the alarm actuating relay 372 and the alarm unit 174 actuated. The alarm may be turned off only by breaking the relay-silicon controlled rectifier loop, that is, by opening the alarm shut-off micro-switch 324. As indicated previously, this may be done only by means of an elegonated key which is inserted through the cylinder insert 322. Thus the alarm will continue to operate unless and until the legitimate tenant or other authorized person having an elongated key 272 is available to insert the key in the opening 320.

The circuit of FIG. 17 is additionally provided with an output relay coil 384 which is connected between the positive and negative which is connected in series with an output switch 386 between the positive and negative wires 358 and 360. The output switch 386 is arranged as shown to be closed upon actuation of the alarm actuating relay 372. When this occurs the output relay coil 384 is energized to close an output switch 386 so that alarm signals may be transmitted via a pair of output wires 388 to remote alarm stations (not shown).

There is additionally provided a safety relay 390 which is connected across the input wires 354. This relay, when energized as during normal operation, maintains the switches 362 and 366 in closed condition as shown in FIG. 17. Should, however, the 110 volt supply voltage fail to safety relay 390 would become de-energized to open the switches 362 and 366. This would automatically place the electrical system in a standby power condition whereby the various batteries 178 would supply the total current necessary to maintain operation of the system. This then would maintain the electronic security system intact even in the event of an external power failure.

As stated above, there is provided a penetration switch 382 in series along the loop 380. The penetration switch is energized by means of a penetration switch actuating coil 392. The actuating coil 392 is connected between the positive wire 358 and a terminal 394 of a conductive sheet or layer 396. The conductive surface 396 is separated by means of an insulative sheet or layer 398 from a second conductive sheet or layer 400. The second conductive sheet or layer 400 is provided with a terminal 402 which in turn is conducted via a wire 404 to the negative wire 360 from the power supply 356. Should any portion of the two conductive sheets or layers 396 and 400 come into contact with each other, the coil 392 will be placed across the positive and negative wires 358 and 360 and would thereby be energized to open the penetration switch 382. This as explained above will have the effect of actuating the alarm.

The various sheets or layers 396, 398 and 400 are arranged in laminate form over the outside surface of the door 130. Thus any attempt to penetrate the door as by means of a saw or other tool will cause an electrical interconnection of the two conductive layers 396 and 400. The actual configuration of these layers will be shown and described more fully hereinafter.

The present invention provides additionally for the protection of an apartment or enclosure from attempted entry by means of a window or other occasionally used enclosure. In FIG. 18 there is shown an arrangement incorporating the present invention for protecting sliding type windows from attempted unauthorized entry. FIG. 18 shows fragmentary portions of the upper and lower sliding structures 410 and 412 of a slide type window indicated generally at 414. A lock-alarm unit indicated generally at 416 is mounted on the upper surface of the lower window portion 412 close to one edge thereof. The unit 416 comprises a relatively thin, flat base member 418 on top of which is positioned a housing member 420. A loudspeaker 422 or similar acoustical emission means through which locally generated alarm signals may be omitted, is provided within the housing member 420. The housing member 420 is additionally provided with a transverse bore 424 within which is positioned a cylinder lock 426. The cylinder lock 426 is key operated; and when rotated to a certain rotational position, it may be moved in an axial direction.

Turning now to FIG. 19, it will be seen that the cylinder lock 426 is provided at its inner end with a bolt element 428 which projects and retracts with the cylinder lock 426; and which when projected, as shown in FIG. 19, engages a corresponding recess 430 in the upper window portion 410. This has the effect of interlocking the two window portions 410 and 412 thus preventing their moving with respect to each other and thus effectively locking the windows in a closed condition. When the cylinder lock 426 and its associated bolt elements 428 are retracted from the recess 430, then the upper window portion 410 is freed to slide up and down within a guide arrangement 432 in a window frame 434. Similarly, the lower window portion 412 is free to slide up and down within a guide recess 436 in the window frame 434.

Should any attempt be made to force open the two window portions 410 and 412 by pushing down on the upper portion 410 or by pushing up on the lower portion 412 the opening force will be transmitted through the bolt element 428 and the cylinder lock 426 to the housing member 420. The housing member 420 is mounted on the base member 418 in such a manner as to permit a slight amount of relative movement between these two members under a pre-determined degree of force applied to the bolt element 428. As a result of this relative movement, a switching action is produced within the unit 416 initiating the generation of an alarm signal and the emission of an audible alarm via the loudspeaker 422.

Figures 20, 21, 22:
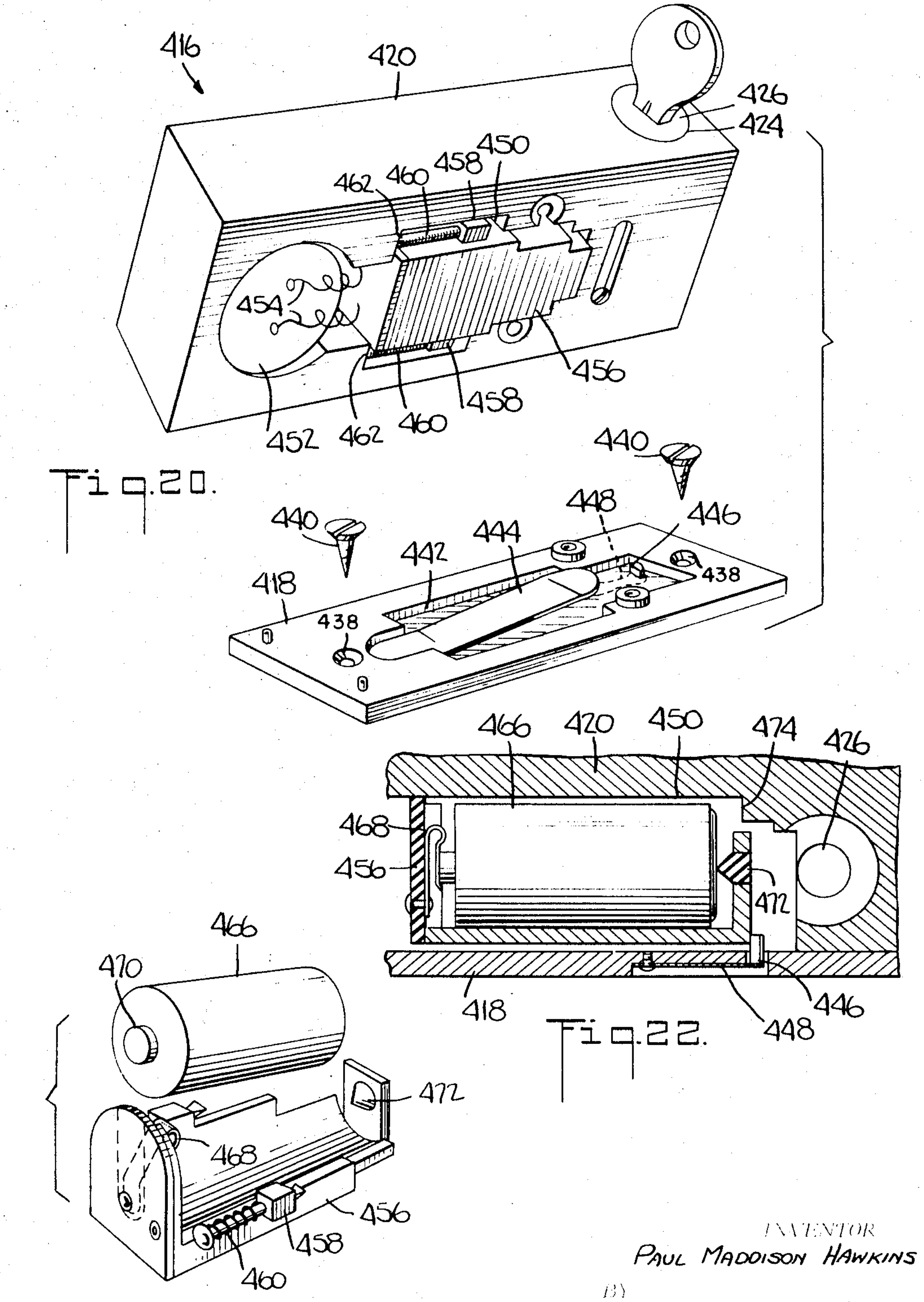
FIG. 20 is an exploded perspective view of the alarm unit of FIG. 18.
FIG. 21 is a perspective view of a battery casing forming one portion of the unit of FIG. 20.
FIG. 22 is a section view taken in side elevation illustrating the relationship of the battery casing and outer housing members of the unit of FIG. 20.

Turning now to FIG. 20, the base member 418 is shown to be a flat, slab-like element provided with holes 438 through which screws 440 are used to secure the member to the upper surface of the lower window portion 412. The base member 418 is recessed centrally as indicated at 442; and a resilient sheet metal tongue like member 444 is mounted within the recess 442 of the base member 418. A release pin 446 is also located within the recess 442 beyond the tongue like member 444. The release pin 446 is spring biased by means of a flat leaf type spring 448 to an upward position as shown in FIG. 20. The release pin 446 however may be pushed down against the force of the spring 448 so that it is flush with the lower surface of the recess 442.

The housing member 420, as shown in FIG. 20, is formed of a single block of solid material and is recessed as indicated at 450 to provide access for the various operating components of the unit. An electrical alarm generator 452 is mounted in one portion of the recess 450, so that it opens out to the loudspeaker 422. This alarm generator may be an electrical buzzer such as is found on bicycles and the like, or it may be an electronic siren arrangement. The alarm generator 452 receives electrical energy from a pair of wires 454 which in turn are connected to a battery via a switching arrangement to be described. There is additionally provided a movable battery casing 456 located within the recess 450 of the housing member 420. This battery casing has formed on either side thereof a pair of lugs 458. Compression springs 460 extend between these lugs and shoulders 462 in the recess 450 to urge the battery casing 456 in a direction toward the cylinder lock end of the recess 450.

The battery casing, as shown in FIG. 21, comprises a housing formed to receive a batery 466. The front end of the battery casing is provided with a spring clip 468 which makes contact with the positive terminal 470 of the battery 466. The spring clip 468 is connected to one of the wires 454 leading to the electrical alarm generator 452. The negative terminal of the battery is held away from electrical contact with the casing 456 by means of an insulating button 472.

Turning now to FIG. 22, it will be seen that the recess 450 in the housing member 420 is formed with a shoulder 474 toward its cylinder lock end. This shoulder becomes contacted by the negative end of the battery 466 when the battery casing moves under the influence of the compression springs 460 in a rearward direction toward the transverse bore 424 and the cylinder lock 426. The shoulder 474 is connected via the housing 420 to the remaining one of the wires 454 supplying the electrical alarm generating unit 452. As shown in FIG. 22, the battery casing 456 is held away from the shoulder 474 by means of the release pin 446 which extends up and holds the battery casing 456 back against the force of the compression springs 460. Should however the battery casing 456 be lifted up off of the release pin 446, the compression springs 460 will then allow the battery casing to move forward so that the negative terminal of the battery 466 contacts the shoulder 474 thus completing a circuit between the battery and the electrical alarm generating unit 452.

Reverting to FIG. 20, it will be seen that the battery casing 466 is held up into the recess 450 of the housing member 420 by means of the resilient action of the tongue like member 444 when the housing 420 is mounted on the base member 418. When the housing 420 is initially pressed down on the base member 418, the lower surface of the battery casing 456 presses down on the release pin 446 and the battery casing remains in its shoulder contacting position.

Turning now to FIGS. 23 and 24 it will be seen that the cylinder lock 426 is formed with a cam surface 475 which, as the lock 426 is retracted, contacts the negative end of the battery casing and urges it away from the shoulder 474 against the action of the compression springs 460 until the corner of the casing is brought beyond the release pin 446. The pin, which till now was held down by the bottom surface of the battery casing 456 then moves up under the resilient action of its spring 448 to engage and hold the battery casing in switch triggered position as shown in FIG. 22. Thereafter, whenever the housing member 420 is lifted up off the base member 422 by means of force applied via the bolt element 428, the battery casing 456 will be lifted up off the release pin 446 and will be allowed to move toward the shoulder 474 to complete the circuit connection between the terminal of the battery 466 and the alarm generator 452. As can be seen in FIGS. 23 and 24 the retraction of the bolt element 428 to a retracted or unlocking position causes cocking or setting of a spring switch which is then automatically ready for operation when the bolt element is thereafter projected.

Figure 25:
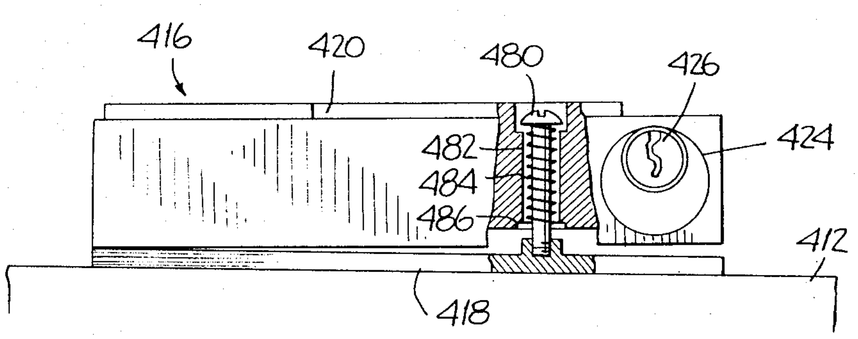
FIG. 25 is a side elevational view, partially broken away, illustrating certain structural interconnections obtained in the arrangement of FIG. 20.

FIG. 25 shows the structural arrangement for securing the housing 420 to the base member 418 in such a manner that it may be moved upwardly under predetermined amounts of force exerted through the bolt element 428. As shown, there is provided a screw 480 which extends down and through an opening 482 in the housing 420 and is threadedly engaged in the base member 418. A compression spring 484 extends between the head of the screw 480 and a lower flange 486 in the housing member 420. As indicated in FIG. 20, there are two such screw-spring arrangements provided, one on each side of the recesses 450 and 442. By tightening the screw 480 the amount of stress on the spring 484 may be adjusted so that the resistance to upward movement of the housing member 420, i.e., the amount of prying force on the window elements necessary to trip the alarm, may be controlled. As shown in FIGS. 23 and 24 the cylinder lock 426 is provided with a guide pin 490 which extends through a transverse slot 492 in the housing member 420. This slot guides the cylinder lock 426 and limits the extent of its transverse movement back and forth. There is additionally provided a recess 494 into which a projection 496 from the cylinder lock 426 extends when the bolt element 428 is projected so as to retain the bolt element 428 in its projected position.

It will be realized that while the above described window protection arrangement is shown in conjunction with its own source of electrical power and its own electrically operated acoustical alarm unit, the above described arrangement could be used solely as a force responsive switching device which would transmit electrical signals to a remote or centrally located alarm system. In such situation, the housing member 420, its attachment arrangement comprising the screws 480 and the compression spring 484 would be retained along with the cylinder lock 426 and the bolt element 428. However, the switching arrangement would be somewhat modified and would not necessarily include the battery 466.

FIGS. 26–29 illustrate a preferred system arrangement whereby the various alarm lock features of the present invention are integrated into the intra-wall wiring of the building or other enclosure being protected. As shown in FIG. 26 a door 550 is mounted by means of three hinges 552, 554, and 556 in a door frame 558 which in turn is set in an opening in a wall 560 of an apartment or other premises to be protected. The door 550 is provided with a knob 562 or similar latch actuating handle; and is additionally provided with an alarm lock system 564 such as described above. The alarm lock system 564 operates in conjunction with a mortise or casing 566 mounted on the door frame 558 to lock the door and to provide various force responsive switching functions for electrically actuating an alarm as above described.

The alarm lock system 564, which may be provided with door mounted batteries, receives its electrical actuating power primarily from the building wiring. As shown in dotted outline a pair of electrical power supply wires 568 proceed from a voltage source (not shown), within the wall 560 toward the door frame 568. The middle hinge 554, as will be described more fully hereinafter, is of special construction and allows the wires 568 to pass from the frame 558 and into a conduit 570 which extends along inside the door 550 to the alarm lock system 564. It will be appreciated that the door 550, and its alarm lock system 564 is always supplied with electrical energy irrespective of the position of the door. Thus, house current is still available to operate the alarm even when the door is partially opened, so that the chain lock-alarm feature may be obtained using house current. Moreover, the emergency button provided on the door is still useable with house current even when the door is opened.

The conduit 570 is additionally utilized to permit alarm signals to be transmitted electrically from the alarm lock system 564, via additional wires 572, back out through the special hinge 554 and frame 558 to a remote wall mounted alarm unit 574. As a result there may be provided a remote alarm which would continue to operate should anything happen to deactivate the door mounted alarm or should an enterprising burglar manage to muffle the audio responses emitted by the door mounted alarm.

The construction of the special hinge 554 and of the adjoining portions of the door 550 and the door frame 558 is best seen in FIGS. 27–29. As shown in FIG. 28, the hinge 554 is made up of substantially identical door and frame mounted hinge elements 580 and 582. Each hinge element includes a flange portion 584, which is screwed or otherwise secured to the door 550 or to the frame 558, and a pin containing portion 586 which is integrally formed with or secured to one edge of the flange portion 584. The pin containing portions are hollow and are formed to accommodate a tubular hinge pin 588. The hinge pin 588 maintains the hinge elements 580 and 582 in proper alignment while at the same time permitting relative pivotal movement so that the door 550 can be swung open and closed.

As shown in FIG. 28, the door 550 (along with the frame 558), is provided with a recess 590 immediately behind its associated hinge element flange portion 584. The conduit passageway 570 containing the various wires 568 and 572 opens into the recess 590; and the wires terminate in a plug receptacle 592. A multiterminal plug 594 is plugged into the receptacle 592. This plug forms one end of a multiwire cable 596 which passes along a groove 598 in the flange portion 584 toward the pin containing portion 586. The cable then extends into one end of the hinge pin 558 and proceeds down through to the opposite end of the pin (FIG. 29). From there the cable extends out along a similar groove in the corresponding flange portion 584 of the other hinge element, and into a similar recess (now shown) in the frame 558.

It will be appreciated that the wires 568 and 572 which bring electrical power into and alarm signals out from the door 550 are completely enclosed, and that they do not interfere in any manner with the normal operation of the hinge 554. Also there is no strain produced on the wires themselves save for a slight amount of twisting back and forth as the door is opened and closed.

The above described hinge assembly is of course applicable to enclosures other than apartment doors. For example automobile door and truck lids may be provided with hinges of this type so that these movable parts may be supplied with electricity without the need for loose exposed wire. The arrangement is useful both for electrical alarm locks as above described and for other electrical devices to be mounted on movable closures, for example, electrical door bells, chimes and lights.

FIG. 26 additionally illustrates the protection of a window 600 in the same room or apartment as the door 550. The window 600 includes upper and lower sliding positions 602 and 604 which are locable in the closed position by means of a lock-alarm unit 606 similar to that described in connection with FIG. 20. In the present situation however, there are provided a pair of intra-wall wires 608 which extend from the unit 606 to the central wall mounted alarm unit 574 to signal any attempt to break through the window.

The outside of the door 550, as shown in FIG. 27 is of laminate construction comprising an inner conductive layer 610, an intermediate insulative layer 612 and an outer conductive layer 614, in sandwiched array. If desire dan additional insulative layer may be placed on top of the outer conductive layer 614 for purposes of appearance. The conductive layers 610 and 614 extend over the entire surface of the door; and they are electrically connected in the same manner as the conductive sheets 396 and 400 of FIG. 17 in series with the penetration switch actuating coil 392 across the positive and negative wires 358 and 360. Thus any attempt to penetrate the door 550 by sawing or drilling to avoid tampering with the alarm, will cause bridging of the layers 610 and 614 by the metal of the cutting tool or by destruction or decomposition of the insulative layer 612 between them. This will complete a circuit to energize the penetration switch actuating coil 392 which in turn will open the penetration switch 392 to actuate the alarm. Thus it will be seen that the closure protected by the door 550 cannot be penetrated in any illegitimate manner.

It will be noted in all of the above that the lock alarm arrangement of the present invention provides for pre-entry protection; that is, an alarm will be actuated in advance of any destructive effect being produced on the lock so that at the time authorized persons are appraised of an illegitimate attempt to gain entry, the locking mechanism is still intact to resist further entry attempts.

What is claimed as new and desired to be secured by Letters Patent is:

1. A lock-alarm system for use with closures, said system comprising a plurality of individual, separately operable locking mechanisms, each of said locking mechanisms being arranged for access thereto on the same side of a closure, a closure fastening means constructed and arranged to unfasten a closure in response to operation of less than all of said locking mechanisms, an electrically actuatable alarm, an electric circuit means for actuating said alarm, said electric circuit means including electric switch means arranged in conjunction with each of said plurality of locking mechanisms to actuate said alarm in response to any operation of said locking mechanism other than simultaneous operation of all said locking mechanisms and to prevent actuation of said alarm upon simultaneous operation of all of said locking mechanisms.

2. A lock alarm system as in claim 1, wherein said electric switch means comprises a separate electrical switch associated with and operated by each of said locking mechanisms.

3. A system as in claim 1 wherein the switch means associated with one locking mechanism is arranged to be closed by operation of said closure fastening means to a closure unfastening condition.

4. A system as in claim 3 wherein another of said locking mechanisms is arranged to be operable together with said one locking mechanism under limited conditions, the switch means associated with said other locking mechanism being openable by operation of said other locking mechanism coincident with operation of said one locking mechanism to a closure unfastening condition.

5. A system as in claim 4 wherein said locking mechanisms are arranged to be operated simultaneously by a common key, the switch means associated with the other locking mechanism being arranged to be closed by operation of said other locking mechanism to a condition corresponding to the closure fastening condition of said one locking mechanism.

6. A system as in claim 5 wherein said locking mechanisms are arranged in tandem inside a housing.

7. A system as in claim 6 wherein said one locking mechanism is closest to the outer surface of said housing.

8. A system as in claim 6 wherein said locking mechanisms are cylinder locks.

9. A system as in claim 2 wherein said locking devices are of the key operated variety and said one locking mechanism is constructed to permit insertion of an elongated key therethrough to extend into operative interaction with the other locking device.

10. A system as in claim 9 further including a further key operated switching device arranged within said housing in a position such as to be operable only by an elongated key capable of operating both said locking devices, said further switching device being electrically arranger in circuit with said alarm means for turning off said alarm.

11. A system as in claim 1 wherein said electrical alarm actuating circuit comprises a controlled rectifier having anode, cathode and gate electrodes and current responsive alarm actuating means including the anode-cathode portion of said rectifier and circuit means including said associated switch means in the anode-gate portion of said rectifier.

12. A self contained electrical lock-alarm system comprising a housing constructed to be mounted near a key operated closure lock, an electrically actuated alarm signalling device mounted in said housing, circuit means in said housing including a pair of electrical input terminals for receiving electrical energy, an alarm acuating switch means arranged in series with said alarm signalling device across said terminals, means for operating said alarm actuating switch means to actuate said alarm, said last-mentioned means comprising a further key operated lock arranged in tandem with said key operated closure lock to be operated simultaneously therewith by a single elongated key and means for closing said alarm actuating switch means upon operation of one of said key operated locks and for maintaining said alarm actuated switch means opened upon simultaneous operation of both said key operated locks.

13. A self contained electrical lock alarm system as in claim 12 wherein said means for operating said alarm actuating switch means further comprises a pair of series connected switches each mounted to be operated by one of said locks.

14. A system as in claim 12 wherein said further lock is arranged behind said closure lock so that said closure lock may be operated alone by means of a shortened key.

15. A system as in claim 12 wherein said means for operating said alarm actuating switch means further includes an electrical latch means operable to initiate and maintain current flow through said alarm actuating switch means upon receipt of an electrical signal, said alarm signalling device being connected in series with said latch means.

16. A system as in claim 15 wherein there is interposed in series with said latch means and said alarm signalling device a key operated shutoff switch.

17. A system as in claim 15 wherein said electrical latching means includes a controlled rectifier.

18. A system as in claim 12 further including separate key operated alarm shutoff means operatively connected to said electrical circuit.

19. An alarm lock system for door-like closures comprising a bolt type lock for mounting on a door a bolt receptacle for mounting on a door casing to receive the bolt from said lock, a chain lock including anchor elements for mounting on said door and closure and further including a tension element adapted to be anchored at each end respectively to said anchor elements, an electrically actuated alarm, circuit means for supplying electrical energy to said alarm, switch means for closing said circuit means, and separate switch actuating means individually responsive to the occurrence of prescribed degrees of stress in said bolt and in said tension element to operate said alarm, said bolt and one of said anchor elements being mounted on a common plate, said plate being adapted for mounting on said door in a manner such that it pivots under stress received via said bolt and said anchor and having spring means arranged to resist such pivotal movement, said switch means in each branch being closeable in response to pivotal movements of said plate.

20. A system as in claim 19 further including third and fourth switches arranged in said switch means, said third switch being arranged to be operated upon retraction of said bolt and a special key operated locking device arranged to operate said fourth switch.

21. A system as in claim 19 further including another switch push-button means mounted on said door for operating said last-mentioned switch to energize said alarm in an emergency.

22. A lock arrangement for selectively limiting movements of a closure member with respect to a stationary member, said lock arrangement comprising and elongated flexible tension element, first means for securing one end of said tension element to one of said members, said first means including retraction means tending to retract the entire length of said tension element toward said one member, said first means including guide means for maintaining said other end of said tension element in a given position near said one member when fully retracted, second means for securing the other end of said tension element to said other member, said second means comprising a guide member mountable on said other member and an engaging member reciprocally movable between projected and retracted positions on said guide member, a further engaging member secured to said other end of said flexible tension element, said further engaging member being formed with a lip beyond which the end of said first engaging member extends when projected, and means for causing lateral expansion of the portion of said first engaging member beyond said lip upon projection of said first engaging member to a key automatic interlock between said second end of said tension element and said other member.

23. A lock arrangement as in claim 22 wherein said retraction means comprises a rotatable axis upon which said tension element may be wound and to which said one end of said tension element is affixed and resilient biasing means connected to urge said axle toward a rotative position coincident with retraction of said tension element.

24. A lock arrangement as in claim 22 further including electrically actuated alarm means and an energizing electrical circuit therefor, and switch means interposed in said circuit and arranged to be closed to operate said alarm means in response to a given degree of tension member force upon said anchor means.

25. A lock arrangement as in claim 22 wherein said anchor element is provided with a lip surrounding said opening and said engaging element is provided with a movable projection for latching behind said lip when said anchor element and said engaging element are mutually engaged.

26. A lock arrangement as in claim 25 wherein said movable projection is formed at one end of an arm extending along in a recess in said engaging element and pivotally attached thereto whereby said projection can move in and out from said recess upon pivotal movement of said arm.

27. A lock arrangement as in claim 26 wherein the other end of said arm is provided with a cam follower projection and wherein said guide member is provided with a cam like configuration for engaging said cam follower projection and forcing same into said recess to project said movable propection when said engaging member is moved to its projected position.

28. A lock arrangement as in claim 27 wherein said guide member and said engaging member are provided with latching means for securing said engaging member in its projected position.

29. A lock arrangement as in claim 22 wherein said guide member is mounted in a housing for limited pivotal movement responsive to application of force by said tension element, spring means connected between said housing and said guide member for resisting such pivotal movement and alarm actuating switch means arranged in said housing and arranged to be actuated by such pivotal movements of said guide means.

30. An alarm lock arrangement for use with closures such as doors, said arrangement comprising a housing, a locking bolt, mechanism within said housing arranged to project and retract said bolt between locking and unlocking positions, key operated means connected to actuate said mechanism, said key operated means comprising a cylinder lock having a rotating plug formed with a key slot therethrough, said rotating plug being provided with a reduced diameter sector extending over said key slot at a given axial position therealong, alarm control switch means positioned within said housing and means responsive to the reduced diameter sector of said plug attaining a predetermined rotational position for operating said alarm control switch means whereby said alarm control switch means will be actuated at one rotational position of said plug when a key whose configuration does not extend out from said reduced diameter sector is in said plug but whereby said alarm control switch means will not be actuated when a key which has a configuration extending up from the reduced diameter sector is in said plug.

31. An alarm lock arrangement as in claim 30 wherein said last mentioned means comprises a pin movable longitudinally in a hole through said cylinder lock to abut up against the outer surface of said rotating plug at said axial position and wherein said alarm control means comprises electrical switch means arranged to be operated by movements of said pin.

References Cited

UNITED STATES PATENTS

| | | | |
|---|---|---|---|
| 2,615,083 | 10/1952 | Krueger | 340—274 X |
| 2,634,409 | 4/1953 | Walcher | 340—274 X |
| 2,818,475 | 12/1957 | Harry | 340—274 X |
| 2,170,521 | 8/1939 | Rodth | 340—274 |
| 2,921,299 | 1/1960 | Zimmerman | 340—274 |
| 3,089,202 | 5/1963 | Pulaski | 16—168 X |
| 3,286,250 | 11/1966 | Teitelbaum | 340—384 X |

FOREIGN PATENTS

| | | |
|---|---|---|
| 621,453 | 5/1927 | France. |
| 367,268 | 1/1922 | Germany. |
| 384,743 | 11/1923 | Germany. |
| 958,960 | 3/1950 | France. |

JOHN W. CALDWELL, *Primary Examiner.*

D. L. TRAFTON, *Assistant Examiner.*

U.S. Cl. X.R.

340—276; 200—44, 61.67, 61.93, 68.81; 70—93, 131